United States Patent [19]

Sethu

[11] Patent Number: 5,812,549
[45] Date of Patent: Sep. 22, 1998

[54] ROUTE RESTRICTIONS FOR DEADLOCK FREE ROUTING WITH INCREASED BANDWIDTH IN A MULTI-STAGE CROSS POINT PACKET SWITCH

[75] Inventor: Harish Sethu, Kingston, N.Y.

[73] Assignee: International Business Machines Corporation, Armonk, N.Y.

[21] Appl. No.: 673,608

[22] Filed: Jun. 25, 1996

[51] Int. Cl.$^6$ .................................................. H04L 12/56
[52] U.S. Cl. ..................................... 370/389; 395/200.73
[58] Field of Search ..................................... 370/230, 235, 370/256, 389, 398, 406, 412, 413, 422, 427, 228, 254, 312, 408; 395/200.15, 200.11, 200.13, 200.73

[56] References Cited

U.S. PATENT DOCUMENTS

| | | | |
|---|---|---|---|
| 4,763,247 | 8/1988 | Borovski et al. | 395/200.73 |
| 5,088,091 | 2/1992 | Schroeder et al. | 370/406 |
| 5,140,583 | 8/1992 | May et al. | 370/422 |
| 5,175,733 | 12/1992 | Nugent | 370/400 |
| 5,224,100 | 6/1993 | Lee et al. | 370/408 |
| 5,313,649 | 5/1994 | Hsu et al. | 395/312 |
| 5,321,813 | 6/1994 | McMillen et al. | 370/228 |
| 5,444,701 | 8/1995 | Cypher et al. | 370/406 |
| 5,453,978 | 9/1995 | Sethu et al. | 370/254 |
| 5,471,623 | 11/1995 | Napolitano et al. | 395/200.73 |
| 5,513,322 | 4/1996 | Hou | 395/200.73 |
| 5,546,391 | 8/1996 | Hochschild et al. | 370/413 |

OTHER PUBLICATIONS

Cheng, T.D. et al., "Function and Performance Enhancement for a Dynamic Routing Network", IBM Technical Disclosure Bulletin, vol. 34, No. 4A, Sep. 1991, pp. 428–429.

Konstantinidou, S. et al., "Deadlock–Free Routing Schemes on Multi–stage Interconnection Networks", IBM Technical Disclosure Bulletin, vol. 35, No. 7, Dec. 1992, pp. 232–233.

Gravano, L. et al., "Adaptive Deadlock–Free Worm–Free Routing with all Minimal Paths in K–Dimensional Tori", Research Disclosure, No. 338, Kenneth Mason Publications Ltd, England, Jun. 1992.

*Primary Examiner*—Hassan Kizou
*Assistant Examiner*—A. Bnimoussa
*Attorney, Agent, or Firm*—Marc A. Ehrlich

[57] ABSTRACT

A method and apparatus for establishing deadlock free routing in a bi-directional, multi-stage, inter-connected, cross-point based packet switch, particularly, though not exclusively employed within a high speed packet network of a massively parallel processing system. Specifically, a group of sets of restricted routes traversing a source, intermediate and destination switch chip are determined by establishing a number of route restrictions from each source switch in the network and determining a number of routes restricted between each source-destination pair of switch chips therein, such that the standard deviation for the number of routes left unrestricted between all source-destination pairs of switch chips for the packet network is minimized. The group of sets of restrictions is created by analyzing a first portion of the network to determine deadlock free route restrictions that comply with the established per switch restrictions and the determined source-destination pair restrictions therefore and then incrementally adding each remaining switch chip for the network and repeating the analysis. Any number of sets from the resultant group of sets of route restrictions may be implemented within the network in accordance with determined link usage and intermediate switch chip usage balancing techniques.

31 Claims, 8 Drawing Sheets

ROUTE RESTRICTIONS FOR DEADLOCK FREE ROUTING WITH INCREASED BANDWIDTH IN A MULTI-STAGE CROSS POINT PACKET SWITCH

CROSS REFERENCE TO RELATED APPLICATION

This application for Letters Patent is related, and cross reference may be had to the U.S. patent application Ser. No. 08/673,706, entitled "Route Restrictions For Deadlock Free Routing With Increased Bandwidth In A Multi-Stage Cross Point Packet Switch" by Harish Sethu, and is filed concurrently herewith.

FIELD OF THE INVENTION

The present invention relates to an apparatus and accompanying method for establishing deadlock-free routing of messages in a multi-stage inter-connected cross point based packet switch. Without loss of generality, the invention is particularly suited for incorporation within a high speed packet based switching network within a massively parallel processing system.

BACKGROUND OF THE INVENTION

Parallel computing systems have been utilized as an expedient solution for increasing processing speeds so as to create computer systems which can manage voluminous data and handle complex computational problems quickly and efficiently. A number of parallel or distributed processing computing systems are well known in the prior art.

A massively parallel processing system may include a relatively large number, often in the hundreds or even thousands, of separate, though relatively simple, microprocessor based processing elements inter-connected through a communications fabric typically comprising a high speed packet network in which each of the processing elements appears as a separate node on the network. Messages, in the form of packets, are routed over the network between these processing elements to enable communication therebetween. Each processing element typically includes a separate microprocessor and associated support circuitry including but not limited to storage circuitry such as random access memory (RAM), and read only memory (ROM) circuitry and input/output circuitry, as well as a communication sub-system comprising a communications interface and associated hardware and software which enable the processing element to interface with the network.

The overall performance of a massively parallel processing system is typically directly related to the performance of the packet network implemented therein. A packet network that is not designed to efficiently transfer messages between the processing elements may adversely affect the system throughput and accordingly may render the massively parallel system an impractical design option for a given application.

In operation, each processing element in a massively parallel processing system executes a pre-defined granular portion of an application. In executing its pre-defined portion of the application is it typical for the processing element to require data from an application program executing on a remote processing element and it is further typical for the processing element to supply the resulting processed data to another application program executing on another remote processing element. A processing element which we will term a "destination element" requests data from another such element which we will refer to as a "source element". The destination element will remain idle in this application until it receives the requested packet(s) containing the needed data from the source element. Upon receipt of the request packet(s) the destination element resumes processing its application portion.

As the request for data and the corresponding transfer of packet(s) is implemented over the packet network there is an associated finite time period corresponding to the transit of messages (packets) over the packet network (i.e. a packet containing a request from the destination element sent to the source element and a corresponding packet(s) sent in an opposite direction as a response from the source element to the destination element). This introduces a degree of latency into the execution of the application portion executing at the destination element. Since most of the processing elements in the system will function as destination elements for application portions running at corresponding source elements, this additive communication latency may significantly diminish system throughput resulting in degraded system performance. Moreover, given the substantial number of processing elements included in a massively parallel processing system and the concomitant need for any one of these elements to communicate with any other such element at any given time, the network must be able to simultaneously route a relatively large number, corresponding to an anticipated peak load of packets among the processing elements.

The implementation of a packet-switched network that yields the desired performance characteristics for inclusion within a massively parallel processing system has proven a daunting development task which has somewhat inhibited the otherwise rapid expansion and increasing use of these systems.

Among the wide variety of available forms of packet networks currently available, perhaps the most traditional architecture implements a multi-stage inter-connected arrangement of relatively small cross-point switches, with each switch typically being an 8-port bi-directional router in which all of the ports are internally interconnected through a cross-point matrix. In this network, each chip in one stage, beginning at one (so-called input) side of the network, is inter-connected through a unique path (typically a byte-wide physical connection) to a switch in the next succeeding stage, and so forth until the last stage is reached at an opposite (so-called output) side of the network. The bidirectional router switch is generally available as a relatively inexpensive single integrated circuit (hereinafter "switch chip") which is operationally non-blocking, and accordingly use of such switch chips in designing switch based packet networks is favored. Such a switch chip is described in U.S. patent application Ser. No. 08/424,824 entitled "A Central Shared Queue Based Time Multiplexed Packet Switch With Deadlock Avoidance" by P. Hochschild et al. filed Mar. 4, 1996, still pending (commonly assigned to the present assignee hereof.)

The above-described topology for a packet-switched network, although comparatively simple and capable of providing high bandwidth among all of its ports, is susceptible to routing deadlocks. Routing deadlocks occur when multiple routes exist between any two switches in the same stage. Although, routing deadlock occurs infrequently in the above-described network, its occurrence, as will be subsequently described, effectively removes each affected port from participation in the switch network, bringing the application under execution to a halt and consequently significantly degrading system performance.

For example, consider a 32-port network of eight switch chips which are organized into two inter-connected stages: a four switch input stage followed by a four switch output stage, all of the switch chips being included on a single switch board. With this arrangement, packets passing between any two ports, on different switch chips, in the input stage would be routed through a switch chip in the input stage that contains the source (input) port to any of the four switches in the output stage. In turn, the switch chip in the output stage would route the packet back (i.e. reverse its direction) to the switch chip in the input stage that contains the destination (output) port for this packet. Inter-switch chip routes are typically pre-defined during system initialization so as to balance packet traffic flowing through the network such that over a relatively short period of time, each byte-wise path will carry an approximately equal number of packets. Once these routes are set, barring switch failure, path failure, or the imposition of a maintenance condition, they are rarely ever changed. The assigned routes available to each processing element are then supplied to that element again during system initialization in the form of a local route table. In operation, as each processing element forms a packet for transmission over the network, that element, based upon the intended destination of the packet, reads the route from its local route table and inserts the route as values of appropriate route bytes in a header of a packet. The packet is then transmitted onto the network and routed through successive switch chips in the input and output stages as specified by the corresponding value of the route bytes in the packet. As the packet traverses a particular switching stage, the last chip in the stage truncates the corresponding route byte from the packet header.

In the past, and particularly in smaller switching networks, routes have been generally implemented without consideration of the potential for routing deadlocks. Routing deadlocks may occur when corresponding packets from different switch chips are waiting to be simultaneously routed over common paths that connect pairs of switch chips in successive stages. Upon the occurrence of a deadlock condition, each affected switch chip, in effect, waits for the others in the group to route their packets over these particular paths. Since none of the switches is able to transit its packet through the network, all of the packets simply wait, and the corresponding paths become deadlocked, with no resulting traffic flow thereover. As a result, while the deadlock occurs, the processing elements to which the deadlock packets are destined are halted and also continue to wait for the packet which, in turn, halts their processing throughput. Thus, the network bandwidth skews to favor those non-affected processing elements causing workload imbalance and hot spots which further degrades system throughput.

Several techniques exist for attempting to avoid the occurrence of deadlocks, each possessing certain advantageous as well as detrimental characteristics. A global arbitration technique could, for example, be applied wherein routing deadlocks would be anticipated and lead to the selection of one from a number of alternate, non-deadlocking routes. However, this technique would require that all packets that are to be transmitted must be monitored to anticipate potential deadlocking routes and the associated arbitration cycles must then be implemented. The circuitry required to enable this would likely be complex and cost prohibitive as it would have to connect externally to each of the switch chips. Thus, such a technique, for most applications, would be deemed impractical.

An alternative technique might involve the formation of a packet network using duplicate switch boards. This technique, when used with the exemplary 32 processor system would require 16 ports, for example, ports 16–31, of a first switch board to the same ports of a redundant switch board. The remaining ports (i.e. 0–15) on each board would be connected to a corresponding one of the 32 processing elements. Packet transfer between source and destination port on a common switch board are routed solely within that switch board. Only those packets which are to be routed between source and destination ports on different switch boards would be routed between the boards. By isolating packets that only flow in the one switch board from potentially interacting with packets that simultaneously flow only in the other switch board, this technique does eliminate deadlocks. Furthermore, this technique does not degrade transmission bandwidth. Unfortunately, the redundancy is a costly measure. Nevertheless, the additional cost associated with duplicating one switch board may not be prohibitive in simpler systems and may in certain cases (such as the 32 processor system) be an acceptable design solution for implementing deadlock avoidance. However, it is desirable to devise a solution which may be cost-effectively implemented on a multiprocessor system of any size.

A solution which potentially accomplishes this, is one which avoids routing deadlocks by simply prohibiting certain routes from being used. Through this particular technique, only a specific sub-set of all possible routes between two switch chips in the same stage would be defined as being available to carry packet traffic therebetween. Prohibition of routes connotes the exclusion of the particular route from the routing tables of the system. The routes that form the sub-set of routes included in the system routing tables would be specifically chosen to ensure that routing deadlocks do not occur. It is evident that as each additional route is prohibited, the total network bandwidth is degraded. Hence the goal in implementing such a technique would be to achieve a deadlock free network while restricting as few routes as possible.

Another problem arising from this so-called route restriction technique is that the resultant non-prohibited routes are often not symmetrically distributed with respect to the processing nodes in the system. Accordingly, transmission bandwidth is not evenly reduced throughout the entire network creating bandwidth asymmetries in the network which may result in the development of so-called "hot-spots" where transmission bandwidth tends to be particularly high at "hot" ports and essentially zero at others. Consequently, processing throughput is skewed so as to tend to favor the processing elements corresponding to these "hot" ports at the expense of other such ports, thereby unbalancing workload processing throughout the network. Degraded system performance is the ultimate result. In fact, when routes were prohibited solely within switch boards, heretofore, there has been no combination of remaining non-prohibited routes that result in an acceptable constant bandwidth reduction throughout the entire network.

In spite of the aforementioned problems, the route restriction technique is an attractive solution for implementing deadlock avoidance. It is simple and highly cost-effective to implement. But for the ability to create acceptably symmetric bandwidth reduction across the network, the inclusion of such a technique in a multi-stage cross-point packet network would be highly favored.

Recently, certain solutions for enabling symmetric bandwidth route restrictions have been devised. For example, U.S. Pat. No. 5,453,978 entitled "Technique For Accomplishing Deadlock Free Routing Through A Multi-Stage Cross-Point Packet Switch" issued Sep. 26, 1995 to Sethu et al. (commonly assigned to assignee herein and incorporated herein by reference), teaches a technique wherein the entire network is effectively partitioned and routes are prohibited in order to isolate packet traffic that would flow solely between nodes coupled to switches in one partition (or system half) of the system from packet traffic that would flow solely between nodes coupled to switches in the other partition. Thus, in picking routes that are to connect nodes in the same partition, routes containing a path passing through the other system partition would be prohibited, but no such route prohibition would be implemented for selecting routes to enable message passing between nodes situated in multiple system partitions. However, the notion of establishing system partitions (or system halves) for implementing route restrictions, while creating symmetrical restrictions, necessarily involves the prohibition of half of the possible routes between processing nodes. It therefore, remains desirable to provide a new route restriction technique which will provide deadlock free routing over a packet network and maintain the symmetry of the restricted routes while requiring fewer route restrictions so as to augment the network bandwidth.

Thus, a need exists for a practical route restriction technique that prevents deadlocks from occurring in a large bidirectional multi-stage inter-connected cross-point packet switching network. The technique should be simple to implement, cost-effective, and minimize as much as possible the bandwidth reduction resulting from route restriction while preserving the symmetrical workload distribution to the processing nodes. Such a technique would greatly facilitate the design and implementation of processing systems including as many as 512 or more processors. Accordingly, massively parallel processing systems could be utilized for application processing needs that would otherwise be precluded.

SUMMARY OF THE INVENTION

The foregoing problems and the shortcomings of the prior art are overcome and additional advantages are provided by the present invention which includes an apparatus and accompanying method for implementing deadlock-free routing of messages in a large bi-directional multi-stage crosspoint based packet switch. The invention is particularly, though not exclusively, suited for incorporation within a high speed packet network of a massively parallel processing system.

Specifically, through use of the present invention certain routes would not be included in the route tables, based upon a derived set of routing rules which, when implemented, balances route restrictions between each unique active switching circuit (or switching chip) in the packet network. The prohibited routes are selected as those which, if not used, would prevent closed loop routing patterns, thereby averting the potential occurrence of a routing deadlock. The routing rules are devised by establishing a postulate number of restricted routes for the packet network which is evenly divisible by the number of active switching chips therein so as to enable the calculation of a per switch chip route restriction number. Furthermore, the restricted routes are those which cross exactly three switch chips in the packet network: a source switch chip in a first stage of switches, an intermediate switch chip in a second stage of switches and a destination switch chip also within the first stage of switches, so as to define sets of source destination switch chip pairs. In accordance with the routing rules of the present invention, for each determined source-destination pair of switch chips capable of supporting a source, intermediate, destination switch chip route therebetween, a number of restrictions therebetween is determined such that the number of routes left unrestricted (and accordingly the number or routes restricted) between all source-destination pairs of switch chips for the packet network is approximately equal, while still ensuring that the number of routes restricted from each source switch chip is equal to the per switch chip route restriction number.

In determining usable sets of these route restrictions, a first portion of the network is chosen to include at least enough switch chips to create a deadlock condition. Within this first portion of the network every possible set of routes that may be restricted between each source destination pair of switch chips included therein is determined, such that for each set of determined routes the number of restrictions per source destination switch chip pair accords with the number previously determined whereby the number of routes restricted for every source-destination switch chip pair is approximately equal. These determined sets are then analyzed to determine whether, for each set, a deadlock condition on the routes left unrestricted, would arise by their imposition. Those sets for which a deadlock free routing pattern is created, are retained in a group of sets.

Switch chips are then added to the first chosen portion of the network and the execution proceeds as above until a group of sets of deadlock free restrictions has been created for the entire network. Upon completion of this group including all switches in the network, it is determined whether, for each set included therein, there exists at least one non-restricted route between every source-destination pair of switch chips. If there is not at least one such route, the postulate number is incremented and execution begins anew.

Upon the successful creation of the group of sets of deadlock free route restrictions, various analytical steps are applied to arrive at a sub-group of restriction sets for imposition within a massively parallel processing system in order to provide balanced packet traffic over the packet networks thereof.

By deriving the routing rules for a portion of the packet network and building it in a piece-wise fashion it is possible to construct a symmetrical deadlock free packet network with a minimal number of route restrictions thereby providing a means for achieving greater bandwidth for the network than heretofore permitted via prior art deadlock avoidance techniques. Furthermore, the incremental construction of the packet network in accordance with the derived routing rules significantly facilitates the process of selecting restricted routes thereby rendering the creation of commercializable parallel processing systems encompassing large numbers of processing elements to serve a wide variety of applications more feasible.

BRIEF DESCRIPTION OF THE DRAWINGS

The subject matter which is regarded as the invention is particularly pointed out and distinctly claimed at the conclusion of the specification. The foregoing and other features and advantages of the invention will be apparent from the following detailed description in conjunction with the accompanying drawings, in which:

To facilitate understanding, identical reference numerals have been used, where possible, to designate identical elements that are common to various figures.

DETAILED DESCRIPTION OF THE PREFERRED EMBODIMENTS OF THE INVENTION

Those skilled in the art readily appreciate that packet networks containing bi-directional, multi-stage, interconnected cross-point based packet switches, regardless of their specific application, are susceptible to routing deadlocks of the type addressed and described herein. Therefore, after considering the following description, those individuals will clearly realize that the teachings of the present invention can be easily and cost-effectively incorporated into nearly any such packet network to prevent these deadlocks from occurring with only a small ensuing reduction in transmission bandwidth. Thus, the present invention will find ready use in packet networks, of essentially any size, destined for use across a wide and diverse range of packet switching environments, whether they are for digital communications, such as in a public or private telephone (e.g. local, wide or metropolitan area networks) or other similar network, or in specialized applications, such as the communication backbone of a massively parallel processing system. Nevertheless, to simplify the following description, we will discuss the present invention in the context of use within illustratively a massively parallel processing system and particularly within the IBM Scalable POWERparallel Systems (SP) High Performance Communication Network employed within the SP family of scaleable parallel processing systems currently manufactured by the International Business Machines (IBM) Corporation of Armonk, N.Y. (which owns the trademarks "IBM", "SP" and "POWERparallel", and is also the present assignee hereof).

To enhance reader understanding, we will first discuss various aspects of packet routing in a parallel processing system and particularly pertaining to a bi-directional crosspoint based packet network used therein, then proceed to illustrate a typical routing deadlock situation and finally describe, in detail, the present invention which advantageously prevents these deadlocks from occurring.

Figure 1:
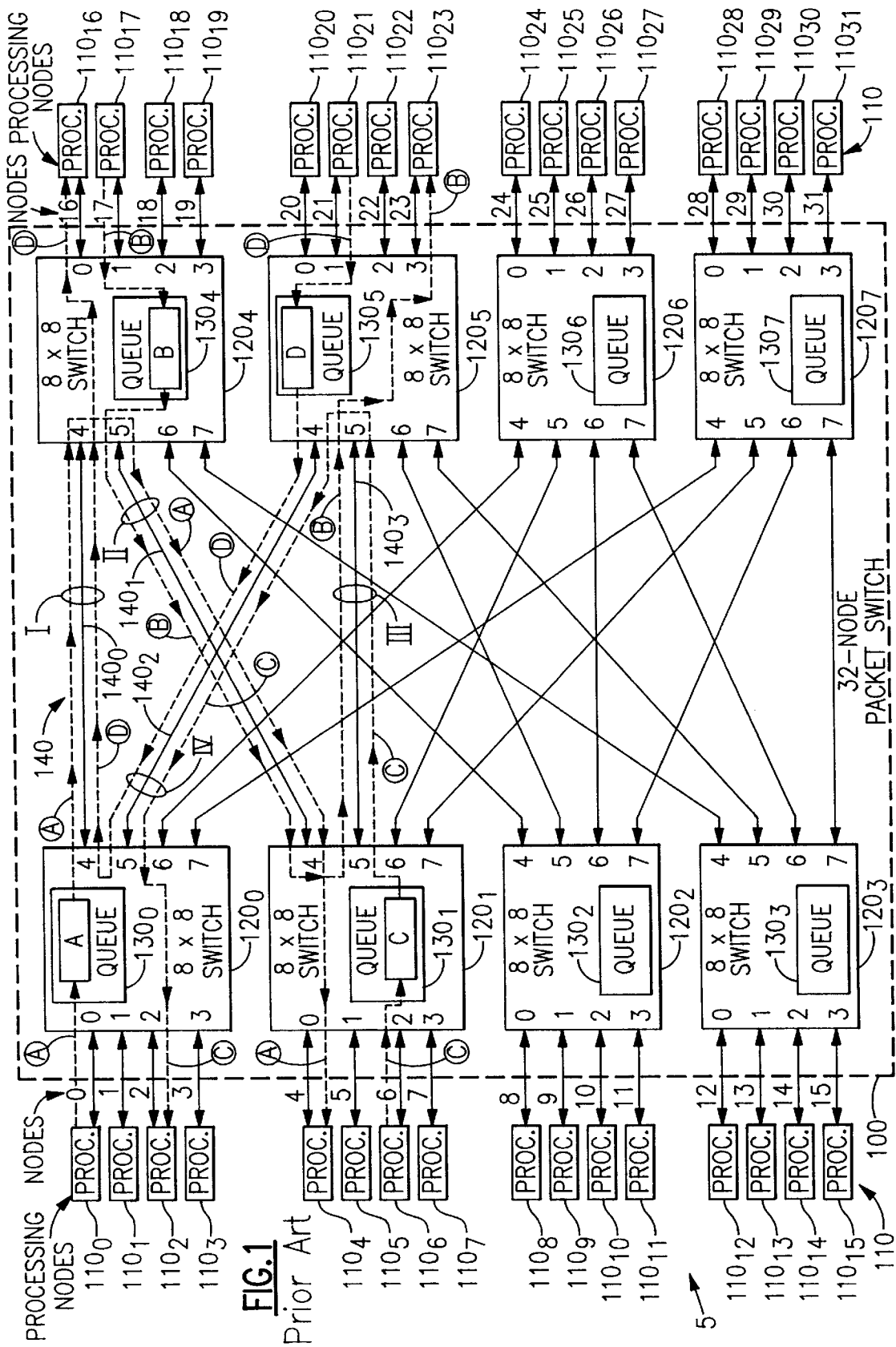
FIG. 1 depicts a high level block diagram of conventional parallel processing system 5 that illustratively utilizes 32 separate processing elements.

First, consider conventional 32-processor parallel processing system 5 shown in FIG. 1. This system contains a 32-node packet switch (also referred to herein as "packet network" or simply "network") 100 to which 32 separate, though generally identical, processing elements 110, specifically processing elements $110_0$, $110_1$, . . . , $110_{31}$, are connected to each of 32 nodes, correspondingly numbered from 0 to 31 provided by this network. Each element forms a processing node of the system. The network 100 provides high speed transport of packets from any one of these processing nodes to any other one. The processing elements themselves are each microprocessor based, typically using an RISC System/6000 microprocessor manufactured by IBM Corporation (RISC System/6000 is a trademark of International Business Machines Corporation). Since the present invention has no bearing on the architecture or circuitry of any of these elements, these aspects, which will be readily apparent to anyone skilled in the art, will not be discussed in any detail herein. Nevertheless, the present invention, as discussed in detail below, is embodied within system initialization software executed within one of these processing elements and route tables stored within each of these elements. Therefore, these particular aspects will be specifically discussed hereinbelow.

As shown, network 100 is configured using eight separate 8-by-8 bi-directional switch circuits 120 organized into two interconnected stages: an "input" stage containing four switch circuits $120_0$, $120_1$, $120_2$, and $120_3$ and an "output" stage containing four switch circuits $120_4$, $120_5$, $120_6$ and $120_7$. The designations "input" and "output" are purely arbitrary for purposes of discussion; in actuality, any stage or port on the network can serve as either an input or output stage or port. Each of these switch circuits is preferably a central queue based non-blocking 8-way router, particularly that described in the U.S. patent application Ser. No. 08/424, 824 entitled "A Central Shared Queue Based Time Multiplexed Packet Switch With Deadlock Avoidance" by P. Hochschild et al. (the "Hochschild et al" application) filed Mar. 4, 1996, still pending (commonly assigned to the present assignee hereof and incorporated herein by reference). Because each switch circuit is advantageously integrated as a single integrated circuit, i.e., a so-called "chip" then for clarity, we will refer to each such switch circuit itself as a "switch chip". Of course, those skilled in the art realize that each switch circuit need not be implemented solely as a single chip. In any event, inasmuch as the switch chip itself does not form part of the present invention, it will not be discussed in any detail, with the reader being directed to the Hochschild et al application for all further details on this circuit. As depicted, each of the switch chips contains a central queue, illustratively queues $130_0$, $130_1$, $130_2$, . . . , $130_7$ situated within corresponding switch circuits $120_0$, $120_1$, $120_2$, . . . , $120_7$. In essence, and to the extent relevant here, the purpose of each central queue is to provide an alternate route through the corresponding switch circuit to, inter alia, ameliorate input blockage and deadlocks, the latter being caused by input ports (specifically the FIFO buffers therein) and queues filled with opposing traffic—a different form of deadlock than that to which the present invention is directed.

The input and output stages of the network are interconnected through connection matrix 140, with each of these connections being essentially a byte-wide physical link (cable), of which illustrative links $140_0$, $140_1$, $140_2$ and $140_3$ are specifically numbered. Through this matrix, a port on each one of the switch chips in the input stage is separately and physically connected to a corresponding port of every one of the switch chips in the output stage. For example, switch chip $120_0$, which provides ports 0–7, is connected through its ports 4, 5, 6 and 7, via corresponding cables, to port 4 on each of switch chips $120_4$, $120_5$, $120_6$, and $120_7$ all in the output stage. Packet switch 100, containing the eight switch chips and connection matrix 140, collectively comprise a single switch board. Ports 0–3 of each switch chip are connected to links external to the switch board; while ports 4–7 of each such chip are connected to links (cables) within connection matrix 140 and hence, therethrough, to a port of another such switch chip within the same board.

In order for processing elements to communicate with each other, such as for one element to request data from another element or to supply data thereto, a "source" processing element, based on an application portion it is executing, fabricates a packet containing an appropriate message, with either instructions and/or data, and transmits that packet into packet switch 100 for transport to a "destination" processing element. The destination element then processes the data and/or instructions contained in the packet and produces an appropriate response which, in turn, based on the application portion executing at the destination processing element, is fabricated into another packet and, e.g., transmitted back into the network for transport to either the source or a different processing element for further processing, and so forth.

To facilitate packet transport through the network, each packet contains a header with specific routing instructions in the form of route bytes. As described below, all routes are pre-defined. Once a source processing element determines the destination for a given packet it is assembling, that element merely accesses its internal (local) route table, with the destination processing element as an address, and reads the route thereto in the form of values of the appropriate route bytes. These values are simply inserted, as the route bytes, into the header of the packet.

Figure 2:
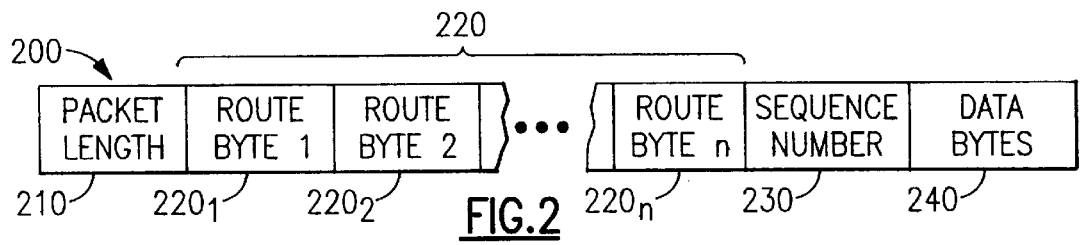
FIG. 2 depicts an illustrative packet 300 that transits through system 5, shown in FIG. 1, and its constituent fields.

FIG. 2 shows the organization of a typical packet, i.e. packet 200, which is transported through the packet network. Individual packets may be as long as 255 bytes. As shown, packet 200 contains a succession of fields: length field 200; route field 220 which itself contains route bytes $220_1$, $220_2$, . . . $220_n$; sequence number field 230; and data field 240. Length field 210 contains an 8-bit value which specifies the length of the packet in bytes. Route field 220 contains several bytes, specifically route bytes $220_1$, $220_2$, . . . $220_n$ which collectively specify a particular and singular route (path) which the packet is to follow through the entire network from its source node to its destination node. Field 230 holds a sequence number provided by the source processing element. This number, assigned by the source processing element for this packet and used by the destination processing element, identifies the order of the packet in a given sequence. As such, this number can be used as a check to prevent destination processing of out-of-sequence packets. Data field 240 contains a succession of bytes that collectively form the data (which may contain actual data and/or instructions) being carried by the packet to a destination processing node. Fields 210, 220 and 230 collectively form a packet header.

The number (n) of route bytes that appears within routing field 220 is determined by the number of switching stages through which the packet will transit. In that regard, each route byte holds routing instructions for two successive switch chips. Hence, if the packet is only to transit through two switch chips in two successive stages, such as shown in FIG. 1, in the network to reach the destination processing node, field 220 only contains route byte $220_1$, and so forth, in a larger network, for additional pair of switch chips used therein. All the route bytes have the same format. In this regard, a route byte (R[7:0]) consists of a 1-bit field selector (R[7]—not specifically shown) and two 3-bit route fields (R[6:4] and R[2:0]—both of which are also not specifically shown). If the value of bit R[7] is zero, then a switch chip routes the packet to an output port on that chip specified by the binary value of bit R[6:4] and then sets the value of bit R[7] to one. Alternatively, if the value of bit R[7] is one, then the switch chip routes the packet to the output port on that chip specified in bits R[2:0] and, while doing so, discards this entire route byte; thus parsing the route byte from the packet. Hence, each route byte provides routing instructions for two successive switch chips. By concatenating n route bytes into route field 220, each packet can be routed through up to 2n stages of switch chips.

Collectively speaking, a switch chip that receives a packet examines the first route byte then existing in that packet and routes the packet to the port indicated by that byte. In the course of doing so, every alternate switch chip in the path of the packet truncates (removes) that entire route byte from the packet. This, in turn, makes the next successive route byte in route field 220 the first route byte for the next switch chip and switching stage. Upon arriving at the destination processing node, the packet will contain no route bytes. Each switch chip is oblivious to any additional route bytes beyond the first byte then carried by the packet and upon which that circuit conducts its specific routing. Furthermore, each switch chip does not distinguish between any route bytes other than the first route byte and any following data bytes.

As noted above, routing is accomplished, during packet assembly, by first inserting pre-defined route bytes into a packet header with the subsequent actual routing of the packet being conducted and dictated, within the network independent of the source and destination processing elements, by the specific value of each of those bytes.

Figure 3:
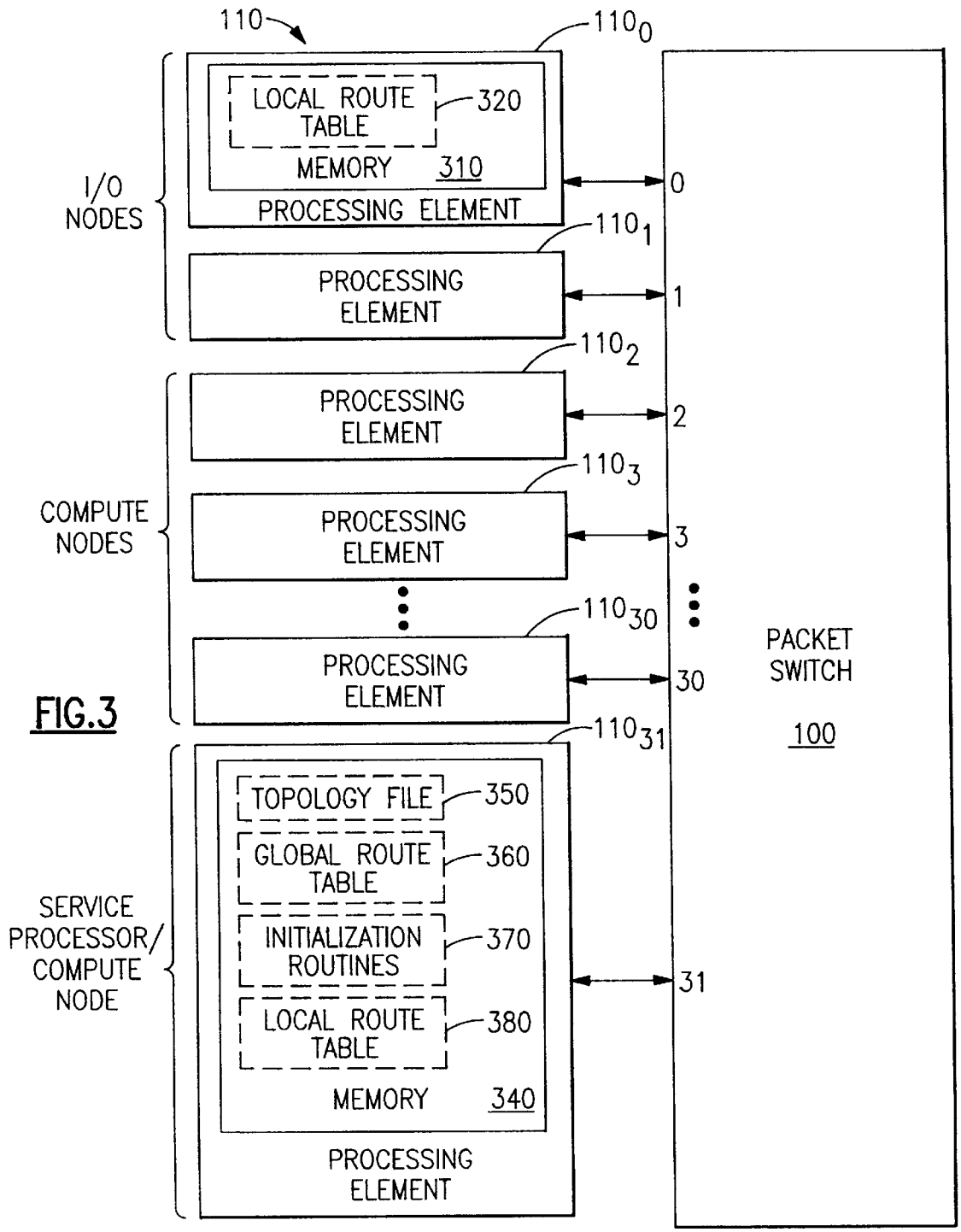
FIG. 3 depicts processing nodes 110 that comprise system 5, shown in FIG. 1, and specifically various files and tables resident in memory within these nodes to accomplish packet routing.

FIG. 3 depicts processing nodes 110 that comprise system 5, shown in FIG. 1, and specifically the various files and tables resident in memory within these nodes to accomplish packet routing. Packet switch (network) 100 functions in two modes, time multiplexed together: a run phase, during which the switch circuits simply route incoming packets, and a service phase, during which the processors are initialized and/or the network is monitored and managed on a circuit-switched basis. All devices attached to the network transfer between modes on a synchronized lock-step basis. During the run phase, certain processing elements may be relegated to certain tasks. For example, processing elements $110_0$ and $110_1$ may be dedicated as input/output (I/O) nodes in order to provide links from system 5 to other networks or processing systems and thus transfer information therebetween. Other processing elements, such as illustratively elements $110_2$, $110_3$, . . . $110_{31}$ may all be used as compute nodes for actual application processing. One of the processing elements, such as processing element $110_{31}$, is used as a service processor to undertake various network operations during the service phase. If desired, during the run phase, the service processor can also function as a compute node. Though the service processor is identical, from a hardware standpoint, with all the other processing elements, the service processor contains, within its memory (here memory 340), and executes additional software, inter-alia initialization routines 370, that execute during the service phase. For example, this phase provides: initialization, communication link synchronization, global time synchronization, fault determination and isolation and various diagnostic services to all the switch circuits and all other devices, including all other processing elements, connected to the network. Since the initialization function is the only portion of the service phase relevant here, only this portion of the service phase will be discussed hereinbelow and particularly only those aspects pertinent to packet routing and the present invention. The initialization phase is undertaken before the system undertakes any application processing.

Service processor $110_{31}$ stores, within its memory 340, a database, specifically topology file 350, of structured entries that collectively define each and every device, including (though not limited to) all the processing elements, that are connected to the network and the specific bi-directional physical connections (cables) used in the network to link these devices. The manner through which the database is created is not relevant here and thus will not be discussed. Within the topology file, the maximum numbers of switch circuits and other devices are identified first, by a device entry, followed thereafter by an entry of each physical connection that exists between any of these circuits and the devices. A device entry contains two numeric fields and is of the form: "number of devices ($n_d$); number of switch circuits ($n_s$)". Given these values, device identification (id) numbering is then assumed to be in the range from 0 to $n_d$, and switch circuit id numbering from 0 to $n_s$. For a network containing a maximum of 16 devices and 8 switch circuits, the device entry would simply be "16 8". Each connection entry has six fields and is the form of: "device 1-type; device 1-id; device 1-port; device 2-type; device 2-id; device 2-port". Devicetype information specifies the nature of the device, i.e. whether that device is a processing element, if so, whether that element is the service processor, or whether that element is a switch circuit. An illustrative connection entry might be "tb0 14 0 s 3 6" which indicates that "a processing element labeled with id 14 is connected in full-duplex fashion from its port 0 to both input and output port 6 on switch circuit 3". The wiring of the network is usually quite regular, well defined and symmetric. However, in actuality, some of the switch boards may be powered down for maintenance or other network components, such as cables, switch circuits (specifically the switch chips used therein) or processing elements, intentionally isolated as a result of a failure condition. Hence, the resulting network topology at any one time may be quite irregular.

In any event, during initialization and specifically execution of initialization routines 370, service processor $110_{31}$ reads topology file 350, as it then exists, and then physically determines, through broadcasting test messages and receiving corresponding responses thereto, the status of each connection in the network as well as of each device connected thereto. Based upon these responses, the service processor determines, using, e.g., a well-known breadth-first search, all the available routes that can be used to connect each (source) node of the network to every other (destination) node of the network. Given the path redundancies inherent in the bi-directional multi-stage cross-point network, several routes, through different switch circuits in different switch stages, often exist to connect a pair of source and destination nodes. In view of multiple routes between each common pair of source and destination nodes, the service processor then selects one of these routes for each of these pairs of nodes and stores that route in global route table 360 within memory 340. These routes are typically selected primarily on a shortest-path basis consistent with achieving, over a unit time, a substantially uniform distribution of packet traffic throughout the network in order to avoid traffic congestion and hot-spots in the network.

Once global route table 360 has been fully constructed to define a path between each pair of available source and destination nodes of network 100, service processor $100_{31}$ then provides, through the network, a corresponding portion of that table to each of the individual processing elements, including itself, for storage thereat as a local route table. That portion contains only those routes which list that particular processing element as the source node. Thus, for example, processing element $110_0$ stores, within its memory 310, local route table 320; and service processor $110_{31}$ stores, within its memory 340, local route table 380, and so forth for each of the other processing elements. During packet formation, as noted above, each processing elements merely accesses its local route table, and, based upon the destination of the packet then being assembled, copies the values of the routing bytes for that destination from the table into the header for that packet.

Now, with the above in mind, let us return to FIG. 1 to illustrate a routing deadlock.

A routing deadlock can occur whenever corresponding packets, each situated in, e.g., the central queue within different switching stages of switch chips, are waiting to be simultaneously routed over common paths that connect pairs of switch chips in successive stages. Therefore, assume, for the moment, that a packet, denoted as "A", resides in central queue $130_0$ of switch chip $120_0$ and is waiting to be routed from processing node $110_0$, over a dashed line path identified with a circled "A", to processing node $110_4$. Through this path, packet "A" would be directed by switch chip $120_0$, over cable $140_0$, to port 4 of switch chip $120_4$, and then be routed back, via port 5 of this latter chip and cable $140_1$, to the input stage, and specifically port 0 of switch chip $120_1$ which connects to processing node $110_4$. Similarly, assume that, simultaneously with packet "A" residing in queue $130_0$, three other packets, labeled "B", "C" and "D", reside in central queues $130_4$, $130_1$ and $130_5$ within switch chips $120_4$, $120_1$, and $120_5$, respectively. Packet "B" is to be routed from processing element $110_{17}$, connected to node 1 of switch chip $120_4$, via a dashed line path labeled with a circled "B", to processing element $110_{23}$ connected to node 3 of switch chip $120_5$. Similarly, packet "C" is to be routed from processing element $110_6$, connected to node 2 of switch chip $120_1$, via a dashed line path labeled with a circle "C", to processing element $110_2$ connected to node 2 of switch chip $120_0$. Likewise, packet "D" is to be routed from processing element $110_{21}$, connected to node 1 of switch chip $120_5$, via a dashed line path labeled with a circle "D", to processing element $110_{16}$ connected to node 0 of switch chip $120_4$.

As shown, all four packets have routes that will simultaneously conflict and take them over the same set of four cables, specifically $140_0$, $140_1$, $140_2$ and $140_3$, with each route sharing its cables with two other routes. Consequently, each of switch chips $120_0$, $120_1$, $120_4$, and $120_5$ will wait, with these packets residing in their corresponding central queues, for any other one of these switch chips to route its packet first. Inasmuch as each of the packets will basically reverse its direction, i.e. "turn around", in one of the switch chips (though through different ports therein), the routes to be taken by all these packets would collectively form a closed loop pattern (indicated by numerals I-II-III-IV and referred to herein as a "cycle"). Because the switch chips are simply incapable of determining which of these particular packets to route first, all of the switch chips will just wait and none of the packets will be routed. As such, each of the four packets in the cycle will block the remaining three. Consequently, a routing deadlock occurs. While this deadlock persists, the corresponding path carries no packet traffic. Hence, processing elements $110_4$, $110_{23}$, $110_2$ and $110_{16}$, in merely waiting for their packets to arrive, effectively suspend processing of those application portions which require these packets. This, in turn, disadvantageously reduces the processing throughput of system 5. Once a routing deadlock occurs, it lasts indefinitely until it is cleared in some fashion. Although routing deadlocks happen relatively rarely, as the size of a parallel processing system increases, the potential for these deadlocks to occur also increases.

In view of the above-described phenomena, the present invention presents a method and associated apparatus for preventing routing deadlock from occurring. Advantageously, the present invention provides deadlock free routing over a packet network while maintaining the symmetry of the restricted routes. The invention requires fewer route restrictions than traditionally required in prior route restriction implementations so as to augment the network bandwidth.

Through the present invention, certain routes would be prohibited from inclusion in the global routing table, based upon the implementation of a pre-defined set of routing rules. The routing rules call for the determination of a total number of routes passing through three switch chips (i.e. a source, an intermediate, and a destination switch chip) to be restricted in the network. The established number of restricted routes is to be evenly divisible by the number of active switch chips in the packet network. Any switch chips that are present in the parallel system, but not connected to the packet network 140, are not considered in this calculation.

Performing the division of the number of restricted routes by the number of active switch chips in the packet network results in a per switch route restriction number for the packet network. This is the number of routes traversing the three switch chips that are to be restricted from originating at each source switch chip to implement the routing rules so as to arrive at a set of routes to be excluded from the global routing table.

In determining which of the routes are to be restricted at each of the source switch chips, the routing rules dictate that any pair of unique switch chips (i.e. switch chips that are not coupled to identical processing elements) termed a source and destination switch chip which were capable of possessing a route (or a number of routes) therebetween traversing three switch chips (i.e. from the source switch chip, through an intermediate switch chip to the destination switch chip) before the restrictions have been imposed, must possess at least one such route after the route restrictions are imposed. No such route prohibition is necessary between non-unique switch chips, as will be subsequently illustrated, since there is no reason to route packets over the packet network 140 to reach processing elements that are capable of being accessed from a given switch chip, these routes are de-facto not considered for inclusion within the routing table in accordance with shortest path route selection schemes well known to those skilled in the art.

As an example of this notion, consider FIG. 1, if a switch chip having identical processor element connections as switch chip $120_0$ were added to the packet switch as $120_8$ (not illustrated), it would not be necessary to route packets from the processors coupled to switch $120_0$ to the identical processors coupled to switch $120_8$, since this packet routing could be accomplished within switch $120_0$.

By implementing these pre-defined routing rules, it is possible to provide a deadlock free packet switched network that comprises greater transmission bandwidth than heretofore possible under prior route restriction techniques. In determining the particular routes to be restricted from each of the switch chips, it is additionally possible to produce symmetrical route restrictions (and consequently symmetry among non restricted routes) throughout the network so as to achieve the previously described advantages of a balanced pattern of message routing over the network.

To provide the necessary inter-processor routing capability in a relatively large massively parallel processing system, such as one utilizing 512 separate processing elements, the system uses a number of switch boards, each identical to that described above, organized into two inter-connected stages of switch boards: node switch boards (NSB), in one such stage, that connect individual processing elements, and intermediate switch boards (ISB), in another stage, that are used to inter-connect the NSBs. A 512 processor system typically employs 48 separate switch boards with 32 such boards dedicated as NSBs and 16 remaining boards dedicated as ISBs. Each NSB provides 16 ports to connect to each of 16 different processing elements and another 16 ports to inter-connect to a different port on each of the 16 ISBs. With this arrangement, the NSBs route packets from and to individual processing elements connected thereto and the ISBs route packets between different NSBs, with all of the entire routing specified as described above, by routing bytes contained in the packet headers.

Figure 4:
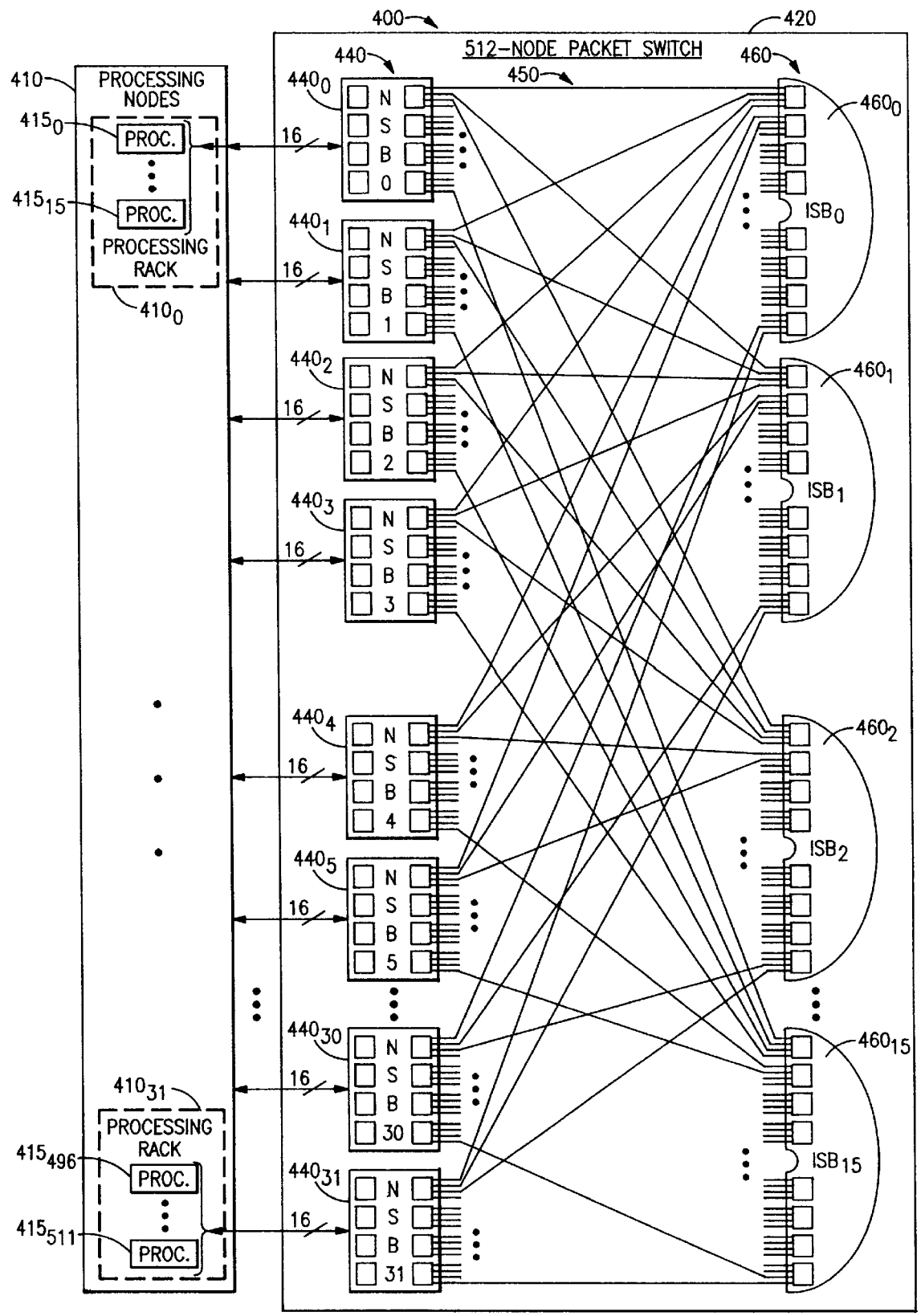
FIG. 4 depicts a high level block diagram of parallel processing system 400 that contains illustratively 512 processing elements and utilizes the teachings of the present invention.

An illustrative 512 processor system is depicted as system 400 in FIG. 4. As illustrated, this system provides 512 different processing elements $415_0$, . . . ,$415_{15}$, . . . ,$415_{496}$, . . . ,$415_{511}$, collectively shown as processing nodes 410 and organized, from a physical standpoint, into 32 physical racks of 16 processing elements each, specifically processing racks $410_0$, . . . $410_{31}$. Each rack is, in turn, connected to sixteen ports of a respective NSB. System 400 contains 32 NSBs $440_0$, $440_1$, $440_2$, $440_3$, . . . $440_{31}$ (also designated as NSB 0, NSB 1 and so forth). The remaining sixteen ports of each NSB are inter-connected through individual cables in connection matrix 450, to a corresponding port on each one of the sixteen ISBs 460, specifically ISBs $460_0$, $460_1$, $460_2$, . . . , $460_{15}$ (also designated as ISB 0, ISB 1, ISB 2, . . . , ISB 15). As such, for example and as shown, each one of sixteen ports on $440_0$ (NSB 0) is connected to a port 0 on a different corresponding one of the sixteen ISBs, such that NSB $440_0$ can route a packet to each of the ISBs. The other NSBs are inter-connected, as shown, in a similar fashion to every one of the ISBs. Although all of the switch boards, whether an ISB or an NSB, are identical to each other, the ISBs are shown in a manner, different from the NSBs, that facilitates easy depiction of connection matrix 450.

In FIG. 4 as well as other large scale massively parallel processing systems that rely on using intermediate switch boards (or the like), it has been recognized that routing deadlocks can occur, in the absence of a deadlock avoidance scheme, when a packet is routed between two different NSBs through an ISB. When a packet is routed between two different NSBs, the packet reverses its direction within an ISB, in much the same manner as packets "A" and "C" reverse their direction (are "turned around") within switches $120_4$ and $120_5$ in system 5 shown in FIG. 1. Since packets do not originate within an ISB, as shown in FIG. 4, but are merely routed therethrough between different NSBs, closed loop routing patterns, if they were to arise, would of necessity extend to the ISBs and not be limited to exist solely within an NSB. Accordingly, a routing deadlock in system 400 will not be confined to just any one or more of the NSBs themselves.

In accordance with the present teachings, in determining which routes are to be restricted in a 512 processor system as illustrated in FIG. 4, each route between two different NSBs is considered for potential restriction, during system initialization, from inclusion in the global route table. Put another way, routes which turn around within an ISB, and as such would be source-intermediate-destination routes, are considered for potential restriction. Via numerical analysis techniques, the details of which are not necessary in order to understand the present invention, it has been determined that a set of 24 restricted routes is the minimum set of route restrictions that can be imposed within an eight switch packet network, such as the 32 node packet switch shown in FIG. 1, (which is typical for any of the illustrated ISBs) to achieve deadlock free routing therein. However, the resultant packet network is highly asymmetrical and is of limited practical utility, hence it is presumed herein that the minimum set of route restriction that may be imposed within such a packet switch network comprises 32 restricted routes.

In operation, there are often certain routes within a given switch board that are, for various reasons, never traversed. For example, and as previously described, if two switch chips are connected to the same set of nodes (or to the same set of other switch boards), then a route between these two non-unique switch chips would not be necessary. In the exemplary 512 node processor illustrated in FIG. 4 this condition is not present since each of the 32 ports in each ISB will connect to a different corresponding one of the NSBs, however in other systems such as the subsequently described 256 node system, such a condition will exist and must be considered in arriving at the total number of route restrictions to be imposed through the present inventive technique. Moreover, a condition may exist wherein a switch chip is not active on a particular switch board. Again considering the 512 node processor illustrated in FIG. 4, if a switch chip on one of the ISBs is not connected to an NSB then it is clear that packets routed over the network 450 will not enter or leave through that switch chip, and thus the switch chip would be "inactive" in the network. It therefore follows that these so-called inactive switch chips should not be considered when determining the total number of restrictions for the system. Routes which utilize these switch chips as source or destination switches are de-facto restricted by virtue of their inactive status. It should be noted however, that switch chips deemed inactive under the previous definition may still operate as intermediate switches within the ISB, routing packets from an active ISB source switch chip to an active ISB destination switch chip. Thus, certain considerations regarding the restriction of routes that would not be used in the run time operation of the packet network are examined in arriving at the total number of routes that are to be restricted in accordance with the present invention.

Once this total number of routes to be restricted via the present invention is postulated, the route prohibition is carried out through the present inventive technique, as described below, while the global route table is being generated in accordance with Route Table Generation Routine. The processing of the present route restriction technique in conjunction with this Route Table Generation Routine excludes all of the so-prohibited routes from being selected as the defined route between a given pair of network nodes included in the global routing table 360 of the service processor $110_{31}$.

Before considering, in detail, the above-referenced routing prohibition technique, it will be instructive to additionally consider the implementation of the present invention within a 256 processor system in which a subset of the switch chips contained within the ISBs are non-unique.

Figure 5:
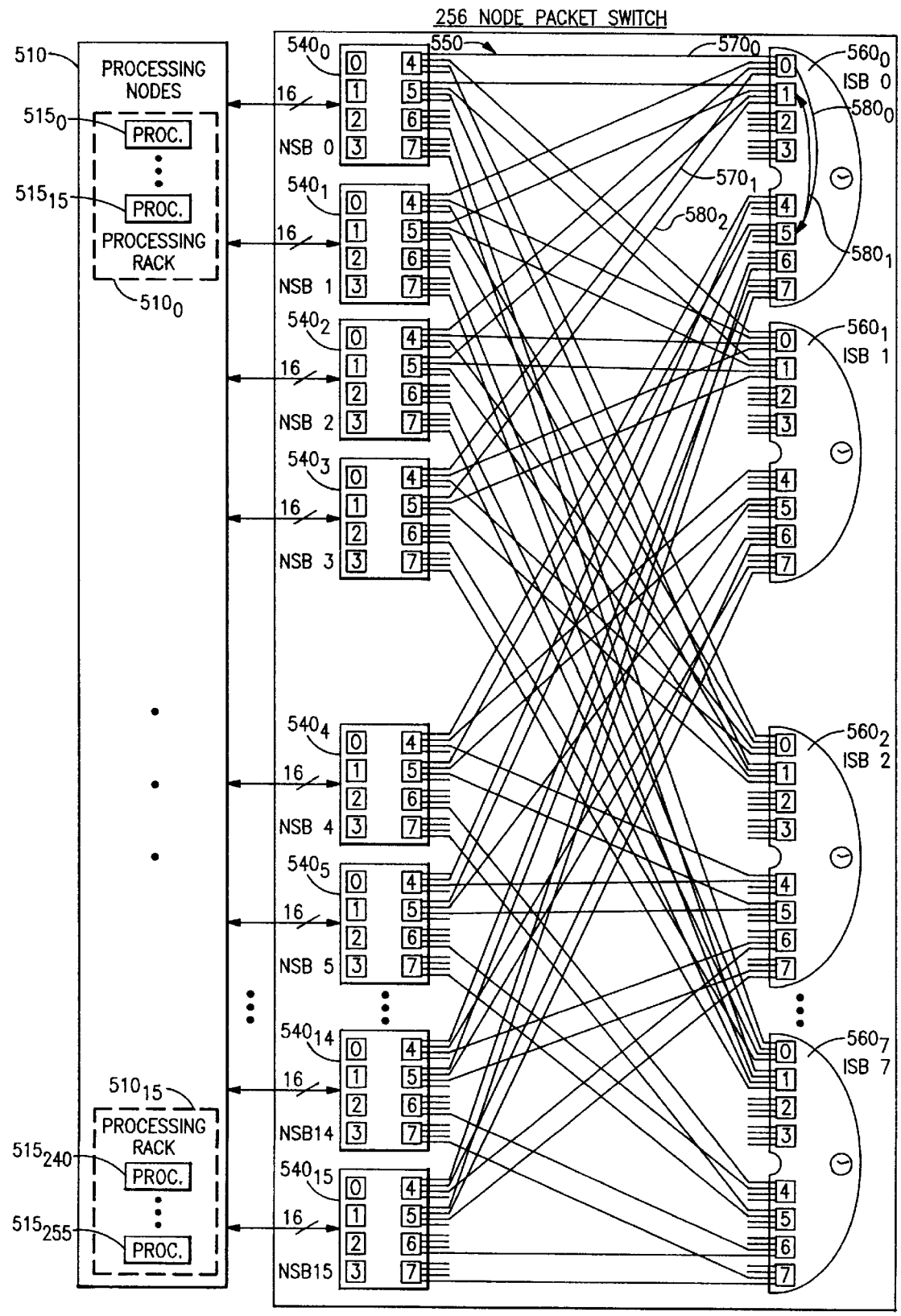
FIG. 5 depicts a high level block diagram of parallel processing system 500 that contains illustratively 256 processing elements and utilizes the teachings of the present invention.

An exemplary 256 processor system is depicted as system 500 in FIG. 5. As illustrated, the system provides 256 different processing elements $515_0, \ldots, 515_{15}, \ldots, 515_{255}$ which are collectively shown as processing nodes 510 and organized from a physical standpoint, into 16 physical racks of 16 processing elements each (i.e. processing racks $510_0$ through $510_{15}$). Each rack is, in turn connected to 16 ports of a corresponding NSB. System 500 contains 16 NSBs $540_0, \ldots 540_{15}$ (also designated as NSB 0, ..., NSB 15). The remaining 16 ports of each NSB are inter-connected with the eight ISBs (specifically ISB 0, ..., ISB 7 or $560_0, \ldots, 560_7$). For ease of understanding a subset of these inter-connections which, if taken as a whole, would form connection matrix 550 is shown. In contrast to the 512 processor system previously described and illustrated in FIG.4, it is apparent herein that each of the 16 ports on a given NSB may not connect to a different one of the 8 ISBs, thus of necessity there are switch chips on the ISBs that connect to identical sets of NSBs (i.e. non-unique switch chips). Consider, for example, the switch chips 0 and 1 on ISB 0 (or $560_0$). As illustrated both switch chip 0 and switch chip 1 are linked to NSB 0, NSB 1, NSB 2, and NSB 3. If a packet were to be routed between NSB 0 and NSB 3, and initially the packet was carried from switch chip 4 on NSB 0 over link $570_0$ to switch chip 0 on ISB 0, the shortest route to the destination NSB (i.e. NSB 3) would be passage over link $570_1$, between chip 0 on ISB 0 and chip 4 on NSB 3. It is clear that an alternative route from ISB 0 to NSB 3 exists in which the packet would be routed from chip 0 on ISB 0 over link $580_0$ to chip 5 on ISB 0 and from there to chip 1 on ISB 0 over link $580_1$ and finally to chip 5 on NSB 3 via link $580_2$. It would be readily apparent to one skilled in the relevant art that any route selection technique that sought to define a shortest path between any two nodes would eliminate this latter route from inclusion in a global routing table resulting in what may be viewed as a de-facto route restriction. Furthermore, since each NSB linked to switch chip 0 on ISB 0 $560_0$, is also linked to switch chip 1 thereon it is evident that these de-facto restrictions extend to any source-intermediate-destination switch chip routes that pass through switch chips 0 or 1 as intermediate switches. Accordingly, the occurrence of non-unique switches will affect the total number of restrictions that are required to be imposed via the present inventive technique.

Figure 6A:
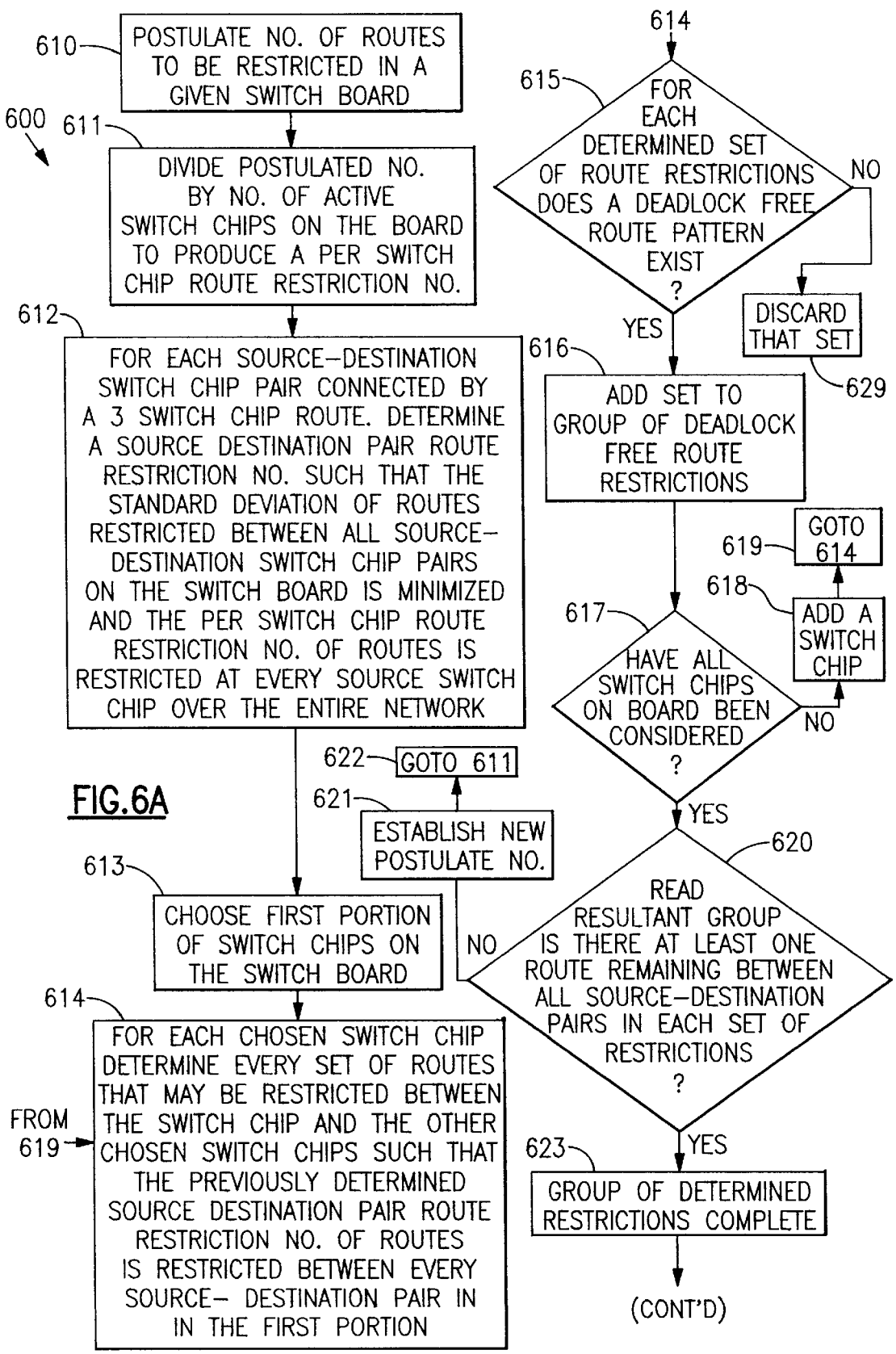
FIG. 6A–6B depicts a high level flowchart of Route Restriction Routine 600 that is executed in accordance with the present inventive technique for defining route restrictions to be used by a service processor, in generating a routing table illustratively processing element $415_{511}$ situated within system 400 shown in FIG. 4 in order to define packet routes in accordance with the present inventive teachings.
Figure 6B:
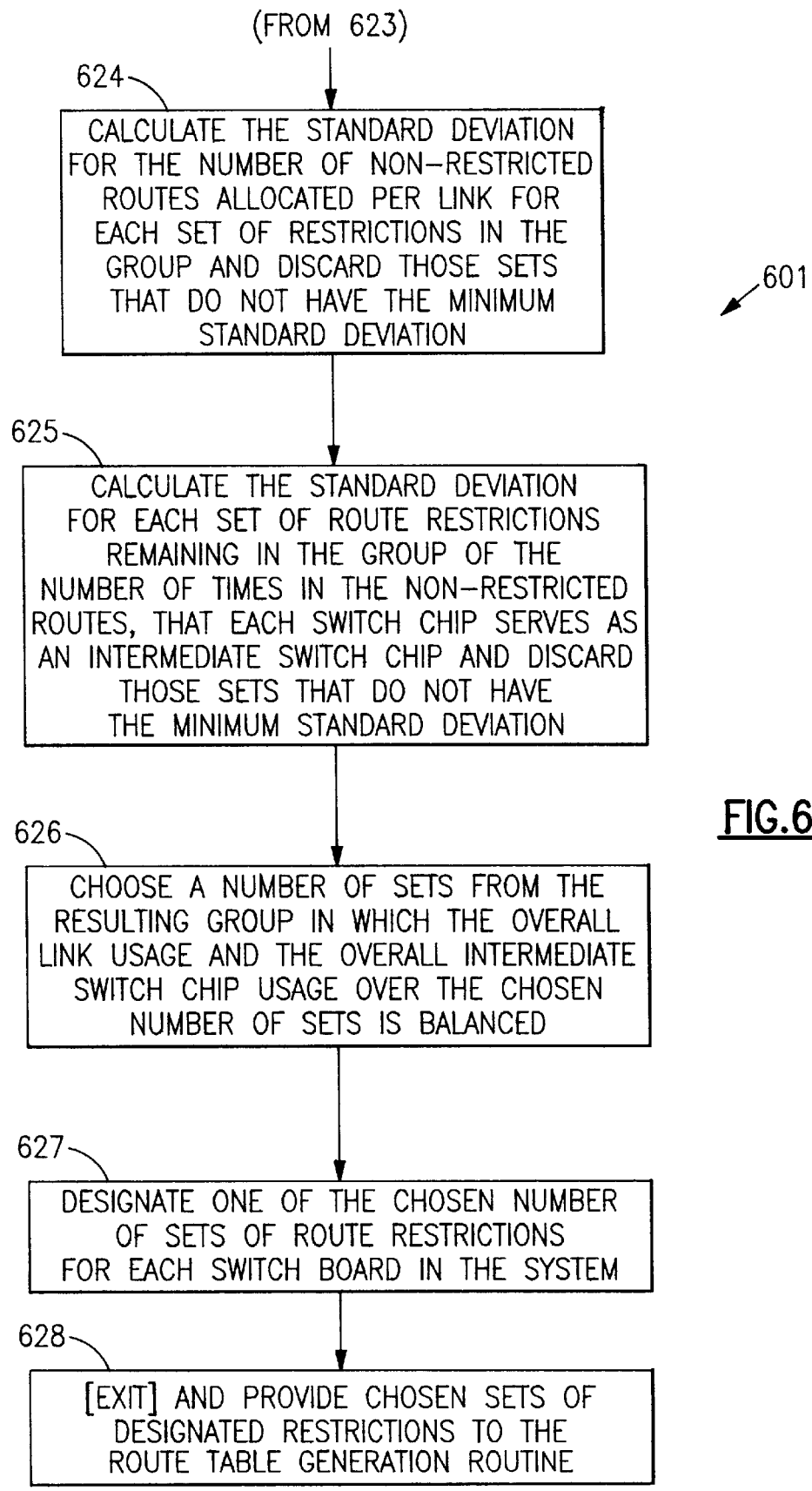

Turning now to a consideration of the present inventive route restriction technique, FIG. 6 (which comprises FIGS. 6A and 6B which are to be read together) depicts a flow diagram which illustrates the steps for determining a group of route restriction sets for a given network (such as packet network 100 in FIG. 1) from which a particular sub-group of route restriction sets will be chosen for imposition thereon within a parallel system such as the system illustrated in FIG. 4 wherein the packet network 100 coincides with any of the networks on the ISBs. With the so-chosen route restrictions, generation of the global route table by a service processor (i.e. $415_{511}$) within the system, in accordance with the aforementioned routing directive, may proceed.

Upon entry into route restriction routine 600, execution proceeds to block 610, at which a postulated number corresponding to the total number of routes to be restricted within a given switch board (for example ISB 0 in FIG. 4 or FIG. 5) in the system is provided. This postulated number may be arrived at arbitrarily, as the routine is an iterative process, which upon completion permits the minimal number of routes to be restricted from the switch board. However, as previously noted, it has been determined, that the imposition of 32 route restrictions within an 8 switch packet network such as that depicted in FIG. 1 and represented by each of the ISBs (i.e. ISB 0, . . . ,ISB 15 in FIG. 4) results in a deadlock free routing scheme wherein the packet traffic over the network may be properly balanced. As also previously noted, any de-facto restricted route such as one arising from the inclusion of non-unique switches on the switch board etc. will not be restricted via the present technique, and may be considered as already an existing restriction, thereby reducing the postulated number for step 610. For example, in the 256 processor system illustrated in FIG. 5 wherein each ISB includes non-unique switch chips this postulate number of route restrictions may be reduced arbitrarily to 16.

At block 611 the postulate number from step 610 is divided by the number of active switch chips on the switch board under consideration (for example in ISB 0 in FIG. 4 & 5, this would be 8) to derive a number of routes to be restricted per switch chip. For the 32 route restrictions postulated for the 512 processor system illustrated in FIG. 4 this would result in a per switch route restriction number of 4 and for the 256 processor system in FIG. 5 in which there were 16 postulated route restrictions the number of per switch route restrictions is 2. Next, at block 612 for each source and destination pair of switch chips on the switch board being considered, (i.e. a pair of switch chips between which a route may exist that traverses three switch chips: a source switch chip from a first (i.e. input or output) stage of switches, an intermediate switch chip from a second stage of switches and a destination switch chip from the first stage of switches) a number will be derived corresponding to the number of routes to be prohibited between the source and destination switch chip pair so that the number of restricted routes for every such source and destination switch chip pair on the switch board will be approximately equal. In a preferred embodiment this may be accomplished by minimizing the standard deviation for the number of routes restricted at each source and destination switch chip pair. For ease of reference this number will be termed the source-destination pair route restriction number, however, it is understood that the number of restrictions between any two such source-destination pairs of switches need not be equal, they need only, when taken as a whole, provide an approximately equal number of routes restricted for each of these pairs. Furthermore, the source-destination pair route restriction number is determined so as to correspond to the derived per switch chip route restriction number, such that by restricting the number of routes between each source-destination pair of switch chips for the network, the required per switch chip number of restrictions is restricted from each of the switch chips therein.

By way of example, consider again the exemplary switch board illustrated in FIG. 1. If the per switch chip route restriction number derived in step 611 is 4, then if we consider the links emanating from source switch chip $120_0$, one route (characterized by a source switch in a first stage of switches, an intermediate switch in a second stage of switches and a destination switch in the first stage of switches) will be restricted between each of source and destination switch chip pairs: $120_0$ to $120_1$, $120_0$ to $120_2$, and $120_0$ to $120_3$. This would amount to three of the four required routes to be restricted from switch chip $120_0$, the fourth restriction may be made between $120_0$ and any of $120_1$, $120_2$, and $120_3$ such that the route restrictions imposed among source and destination switch chip pairs is approximately equal. In a preferred embodiment, the fourth restriction is made between non-adjacent switch chips so as to provide greater network bandwidth for nodes connected to adjacent switch chips.

At block 613, a first portion of the set of switch chips being considered is chosen. The chosen first portion may be any subset of the total number of switch chips from the minimum number of chips through which a closed loop routing pattern (and hence a deadlock) may be formed (i.e. 4 switch chips) up to the total number of switch chips on the switch board (i.e. 8 in the case of the exemplary switch board in FIG. 1). Next, at block 614 the execution of the route restriction routine 600 proceeds to discern every set of possible route restrictions such that for each source-destination pair the number of route restrictions therebetween is equal to the source-destination pair route restriction number (i.e. the source-destination pair route restriction number as defined above is imposed) between any of the previously described source destination pairs of switch chips within the so-defined first portion of switch chips capable of connection by a route characterized by a source switch chip in a first stage of switches, an intermediate switch chip in a second stage of switches, and a destination switch chip in the aforementioned first stage of switches.

At step 615 in the execution of the route restriction routine 600, each of the so-defined route restriction sets in step 614 is analyzed using known deadlock analysis techniques to discern whether the imposition of the set of restrictions would result in deadlock free routing among the routes left unrestricted within the first portion. Any set of so-defined restrictions which will not avoid the occurrence of a deadlock within the first portion are discarded from inclusion in a resultant route restriction group 629. Alternatively, if a so-defined set of restrictions creates a deadlock free network, the set is added to a group of deadlock free route restriction sets 616. Next at step 617 it is determined whether every switch chip in the switch board being considered has been included in the route defining step 614. If not, at block 618 a switch chip is added to the sub-system and via block 619, execution of steps 614 through 616 are repeated. When, at step 617, it is determined that every switch chip in the switch board under consideration has been included in the route defining step 614, the resultant group of sets of route restrictions is created 616.

At block 620, each set of route restriction rules in the resultant route restriction rule group is analyzed to determine whether each source destination pair of switch chips which were capable of connection via any source, intermediate, destination switch chip route (as previously defined) prior to the imposition of the particular route restrictions, can still support at least one such unrestricted route therebetween. If, for any set in the resultant group the above determination is negative, then the postulate number provided in step 610 is incremented at block 621, and the process is repeated via the loop back to block 611 at block 622. If the determination is positive, the resultant group at block 623, represents the sets of route restriction rules which provide deadlock free routing within the considered switch board while assuring that the routing pattern has an acceptable degree of symmetry.

Via application of the above-described execution blocks of route restriction routine 600, for a 512 node processor system such as the system illustrated in FIG. 4, a route restriction group comprising 9312 sets of route restrictions, each set having restrictions corresponding to every switch chip on any ISB in the 512 processor system has been generated.

In post processing section 601 of route restriction routine 600 which includes execution blocks 624 through 628 and is illustrated in FIG. 6B, each set of restrictions in the above-generated group of route restrictions is analyzed to ensure that link usage among links within the switch board under consideration and intermediate switch chip usage among the switch chips on the switch board is approximately equal. Once a sub-group of sets in which link usage and intermediate switch chip usage is balanced for a particular switch board is determined, number of these sets of route restrictions are chosen from among the so-determined sub-group of balanced sets to ensure that link usage and intermediate switch is approximately balanced between the number of switch boards in the system. For example, and as will be addressed subsequently in detail, if a particular chosen set of route restrictions requires that switch chip 0 serve as an intermediate switch chip more than an average number of times for that system, another set will be imposed upon another board in the system, in which switch chip 0 serves as an intermediate switch chip a less than average number of times for the system thereby balancing the overall usage of switch chip 0 on the switch boards in the entire system.

Starting with the derived group of route restrictions from block 623, execution proceeds to block 624 at which the standard deviation for the number of non-restricted routes allocated to each link (i.e. link usage) in the switch board (i.e. a total of 32 links for the exemplary switch board in FIG. 1 which serves as an ISB in the systems depicted in FIG. 4 and FIG. 5) is calculated for each set of route restrictions. The sets having the lowest calculated standard deviation are retained in a sub-group, and all other sets of route restrictions are discarded from the sub-group. It will be understood that methods other than the calculation of the standard deviation of the number of non-restricted routes allocated to each link, may be employed herein, all with the objective of ensuring that for a given set of route restrictions, the number of times each link is used in a route is approximately equal for all of the links in the network. Execution next proceeds to block 625 at which the standard deviation for the number of times each switch chip participates as an intermediate switch chip in the non-restricted routes is calculated for each set of route restrictions in the sub-group resulting from step 624. Finally, the sets having the lowest standard deviation are retained here as a resultant group and the rest of the sets of route restrictions discarded. Once again, it will be understood that methods other than the calculation of the standard deviation of the number of times each switch chip participates as an intermediate switch chip in the non-restricted routes, may be employed herein, all with the objective of ensuring that for a given set of route restrictions, the number of times each switch chip serves as an intermediate switch chip is approximately equal for all of the switch chips in the network In step 626, the resultant group is analyzed to determine which of the sets of route restrictions contained therein will be suitable for use in the network system (for example the 512 processor system illustrated in FIG. 4). In making this determination numerical analysis techniques are implemented to determine for a chosen number of sets from the resultant group whether the overall link usage for all links (i.e. 32 in the case of the exemplary switch board in FIG. 1) in the given number of sets, and the overall intermediate switch usage for all switches (i.e. 8 in the case of the switch board in FIG. 1) in the given number of sets is approximately equal. For example, and as will be subsequently illustrated, in the exemplary 8 switch chip network depicted in FIG. 1, in which three switch chip (i.e. source-intermediate-destination switch chip) paths have been previously described, it is clear that each switch chip may serve as an intermediate switch chip for 12 potential routes. For example, via reference to FIG. 1, switch chip $120_4$ may serve as an intermediate switch chip for packets routed from switch chip $120_0$ to switch chips $120_1$, $120_2$ and $120_3$ and as an intermediate switch chip for packets routed from switch chip $120_1$ to switch chips $120_0$, $120_2$, and $120_3$, and as an intermediate switch chip for packets routed from switch chip $120_2$ to switch chips $120_0$, $120_1$, and $120_3$, and finally as an intermediate switch chip for packets routed from switch chip $120_3$ to switch chips $120_0$, $120_1$, and $120_2$ for a total of 12 potential routes in which switch chip $120_4$ may serve as an intermediate switch chip. Since, in the exemplary system including 512 processors we have determined that we wish to restrict a total of 32 routes on a given ISB (i.e. four restrictions from each switch chip), the average number of routes we should expect to be traversing each switch chip as an intermediate switch chip on a properly balanced switch board, should be 8 (i.e. 12 (possible routes for which the switch chip is an intermediate)—4 (route restrictions per switch chip)=8). Thus, in choosing the number of sets of route restrictions from a group derived for the exemplary system, we should attempt to select sets for which the average intermediate switch usage for each of the switches across the chosen sets would be 8. In determining which sets to choose so as to balance link usage therebetween, essentially the same analysis is performed as will be subsequently demonstrated.

The resulting chosen number of sets of route restriction are then each assigned to ISBs in the system being implemented, at block 627. The imposition of the sets of route restrictions per ISB will permit the generation, by a service processor (such as $415_{511}$ in FIG. 4) of a global routing table excluding the restricted routes defined by the above process. Upon so-imposing the chosen sets of route restrictions, the routine 600–601 exits at block 628, by providing these sets of route restrictions as inputs to, for example, service processor $110_{31}$ for use in routine 800, which, as will be subsequently addressed, creates the global route table 360 for the system. The chosen sets of route restrictions may be provided to the service processor $110_{31}$ via any known computer-readable medium including but not limited to diskettes, CD-ROM, magnetic tapes, etc . . . which would be read into the parallel processing system and therein into the service processor $110_{31}$.

For illustrative purposes, a number of sets of restrictions chosen for implementation within the ISBs for a 512 processor system such as the system illustrated in FIG. 4 is shown in table 1:

TABLE 1

Route Restriction set 1:

switch 0: 4(0000)-5(0011)-6(0101)-7(0110)
switch 1: 4(0010)-5(0000)-6(1000)-7(0000)
switch 2: 4(0101)-5(1001)-6(0000)-7(1100)
switch 3: 4(0010)-5(0000)-6(1000)-7(0000)
switch 4: 4(0111)-5(1000)-6(0000)-7(1000)
switch 5: 4(0000)-5(0001)-6(1000)-7(0100)
switch 6: 4(0010)-5(0010)-6(0101)-7(0010)
switch 7: 4(0000)-5(0001)-6(1000)-7(0100)

Route restriction set 2:

switch 0: 4(0000)-5(0001)-6(0000)-7(0100)
switch 1: 4(0011)-5(0000)-6(1001)-7(1010)
switch 2: 4(0000)-5(0001)-6(0000)-7(0100)
switch 3: 4(0110)-5(1010)-6(1100)-7(0000)
switch 4: 4(0010)-5(0001)-6(1000)-7(0000)
switch 5: 4(0100)-5(1010)-6(0100)-7(0100)
switch 6: 4(0010)-5(0001)-6(1000)-7(0000)
switch 7: 4(0001)-5(0000)-6(0001)-7(1110)

TABLE 1-continued

Route restriction set 3:

switch 0: 4(0111)-5(1000)-6(0000)-7(1000)
switch 1: 4(0000)-5(0001)-6(1000)-7(0100)
switch 2: 4(0010)-5(0010)-6(0101)-7(0010)
switch 3: 4(0000)-5(0001)-6(1000)-7(0100)
switch 4: 4(0000)-5(0011)-6(0101)-7(0110)
switch 5: 4(0010)-5(0000)-6(1000)-7(0000)
switch 6: 4(0101)-5(1001)-6(0000)-7(1100)
switch 7: 4(0010)-5(0000)-6(1000)-7(0000)

Route restriction set 4:

switch 0: 4(0010)-5(0001)-6(1000)-7(0000)
switch 1: 4(0100)-5(1010)-6(0100)-7(0100)
switch 2: 4(0010)-5(0001)-6(1000)-7(0000)
switch 3: 4(0001)-5(0000)-6(0001)-7(1110)
switch 4: 4(0000)-5(0001)-6(0000)-7(0100)
switch 5: 4(0011)-5(0000)-6(1001)-7(1010)
switch 6: 4(0000)-5(0001)-6(0000)-7(0100)
switch 7: 4(0110)-5(1010)-6(1100)-7(0000)

Without loss of generality, in a preferred embodiment of the invention, each of the listed sets of route restrictions is imposed on four of the 16 ISB's present in the exemplary 512 processor system. The sets each contain a list of per switch chip route restrictions that detail, for every port on the switch chip, from which ports a packet entering on that port may exit. In the example shown in table 1 the presence of a "1" within a parenthetical set indicates that a packet entering on the prefixed port may not exit on that port on that switch chip and the presence of a "0" therein indicates that the packet may exit on that port. Furthermore, the sequence of parenthetical numerals is to be read to denote, in order, ports 4, 5, 6, and 7. For example, the entry:

switch 0:4(0100)-5(0000)-6(1000)-7(0000)

denotes that on switch 0 no packets are permitted to enter on port 4 and exit on port 5, likewise no packets may enter on port 6 and exit on port 4. In general X(abcd) implies that when a packet enters port X of the listed switch chip, it is not permitted to exit from port 4 if a=1, from port 5 if b=1 from port 6 if c=1 and port 7 if d=1.

Figure 7:
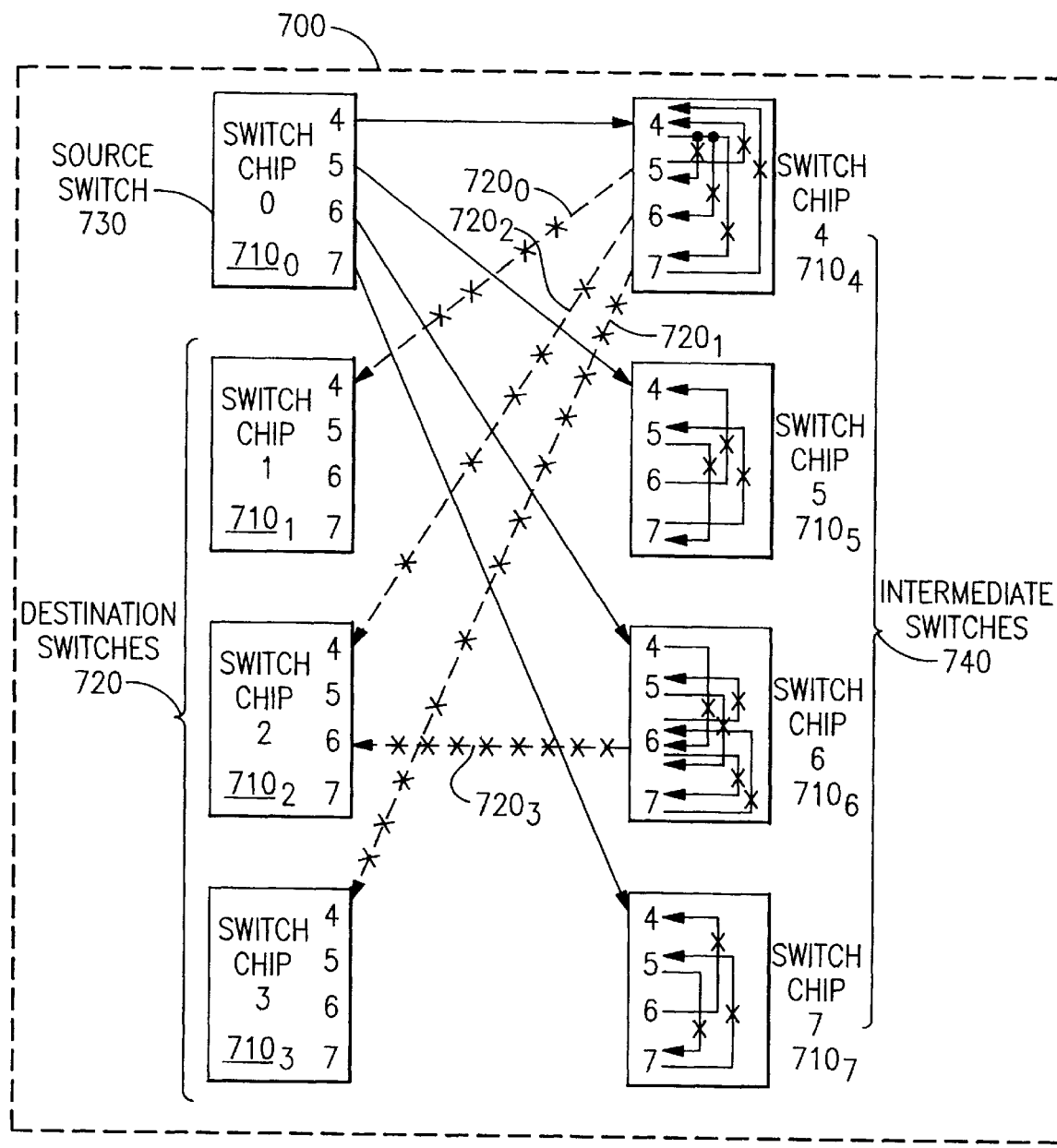
FIG. 7 depicts an exemplary portion of a set of route restrictions for a typical intermediate switch board (ISB) for a 512 processor system 400 such as shown in FIG. 4.

A representation of the restrictions for routes emanating from switch chip 0 ($710_0$) that are embodied in route restriction set 1 in table 1 is shown in FIG. 7 for a typical ISB 700 in a 512 processor system designed in the same manner as the switch board illustrated in FIG. 1. For ease of understanding, routes restricted between any two ports within a switch chip are represented by an arrowed line between the two ports. In FIG. 7 the routes restricted within intermediate switch chips 740 in a second stage of switches (i.e. the stage comprising switch chips 4–7 ($710_4$–$710_7$)) are shown, as these will create the route restrictions for routes emanating from a source switch chip 730 in a first stage of switches (i.e. the stage comprising switch chips 0–3 ($710_0$–$710_3$)) in particular switch chip 0 $710_0$ bound for destination switch chips 750 in the same first stage of switches (in particular switch chips 1–3 ($710_1$–$710_3$). Via reference to table 1 and to FIG. 7 it can be seen that a single one of such three switch routes $720_0$ is restricted between switch chip 0 ($710_0$) and switch chip 1 ($710_1$), that route being the route through switch chip 4 ($710_4$), by virtue of the restriction within switch chip 4 ($710_4$) between packets entering on port 4 and exiting on port 5. In a similar fashion, it can be seen that a single route $720_1$ is restricted between switch chip 0 ($710_0$) and switch chip 3 ($710_3$), that route traversing through switch chip 4 ($710_4$), by virtue of the restriction between port 4 and 7 within switch chip 4 ($710_4$). Between switch chip 0 ($710_0$) and switch chip 2 ($710_2$) there are two such routes restricted, the first $720_2$ being restricted through switch chip 4 ($710_4$), by virtue of the restriction between ports 4 and 6 thereupon, and the second $720_3$, through switch chip 6 ($710_6$), by virtue of the restriction between ports 4 and 6 thereupon. Similarly, by analyzing each of the route restrictions embodied in set one, the reader will appreciate that the four route restrictions imposed at each switch chip will restrict a single route between that switch chip and each of the three other switch chips capable of being connected thereto via a three switch chip (or source-intermediate-destination) route and one additional route will be restricted between one of these three switch chips.

In the set of route restrictions illustrated in FIG. 7 the fourth route is uniformly restricted between the source switch chip 730 and the destination switch chip 750 that is positionally separated from the source switch chip 730 by one other destination switch chip 750. In other words, and as shown, in the case of switch chip 0 ($710_0$), two routes are restricted between switch chip 0 ($710_0$) and switch chip 2 ($710_2$), and the reverse is true in the case of switch chip 2 ($710_2$) (i.e. two routes are restricted from switch chip 2 ($710_2$) to switch chip 0 $710_0$) in the case of switch chip 1 ($710_1$), two routes are prohibited therefrom to switch chip 3 ($710_3$) and the reverse is true for routes in which switch chip 3 is the source switch, and so on through switch chip 7 ($710_7$).

Moreover, an analysis of the route restrictions in route restriction set 1 of table 1 confirms this pattern. Since switch chip 0 ($710_0$) connects to each of the potential intermediate switch chips 740 (i.e. switch chip 4 ($710_4$),switch chip 5 ($710_5$), switch chip 6 ($710_6$), and switch chip 7 ($710_7$)) at port 4, the packet from switch chip 0 ($710_0$) will always enter any intermediate switch chip through port 4. Thus, to determine the restrictions for switch chip 0 ($710_0$), we need only look at the restrictions for switch chips 4, 5, 6, and 7 for packets entering at port 4. This corresponds to a sub-set consisting of the bottom half of the first column of parenthetical numbers in route restriction set 1 in table 1 from the row prefix switch chip 4 through the row prefix switch chip 7 as shown below:

| Ports- 4 5 6 7 |
| --- |
| switch 4: 4(0 1 1 1) |
| switch 5: 4(0 0 0 0) |
| switch 6: 4(0 0 1 0) |
| switch 7: 4(0 0 0 0) |

By examining this sub-set as a 4×4 matrix with column headings corresponding to port 4, 5, 6, and 7 respectively, it is readily apparent that there are two "1"'s in the column corresponding to port 6. Correspondingly, since switch chip 2 connects to the port 6's of each of the potential intermediate switch chips 4–7 (see FIG. 1 connection network 140), it is clear that there are two route restrictions between switch chip 0 and switch chip 2 per the first set of routing restrictions. A similar examination of each of the restriction patterns for each switch chip for each of the 4 sets of route restrictions shown in table 1 will confirm that the above detailed route restriction implementation persists in each route restriction set.

From this set of route restrictions we can see that the postulated number of restricted routes in routine 600 was 32 routes, (i.e. there are 32 "1"'s within the matrix defined by each route restriction set) which when divided by the number of active switch chips on the board (i.e. 8) yielded a per switch chip route restriction number of 4 routes. The four routes were determined to be restricted in such a manner that each set of source destination pairs of switch chips has 1 route restricted therebetween and one of the source destination pairs of switch chips has an additional route restricted therebetween. These routing restrictions are consistent with the routing restrictions between source destination pairs called for in execution block 612 of route restriction routine 600 as illustrated in FIG. 6A.

It is additionally evident, via reference to table 1, that the use of each switch chip as an intermediate switch chip is approximately equal for the exemplary ISB in accordance with step 625 of routine 600. By referring to each row in a given route restriction set, it is possible to determine the number of routes upon which a particular switch chip may be used as an intermediate switch chip by counting the number of "0"'s in that row in other words, the number of routes that a packet entering on a given switch chip may exit that switch chip excluding the entries corresponding to an entry and exit from the same port (since such routes would never be used and are correspondingly de-facto restricted). This number indicates the number of times that a packet entering a switch chip on a given port also exits that switch chip from a different port to reach a destination switch chip other than the source switch chip. As previously determined, the average number of intermediate switch usage in a ISB in which 32 routes are being restricted is 8. By analysis of route restriction set 1, for example, it can be shown that the standard deviation for the number of times each switch chip is used as an intermediate switch chip is 1.58.

Analysis of table 1 likewise confirms the standard deviation calculation performed to ensure equalized link usage within an exemplary ISB as described in block 624 of routine 600. Via reference to table 1, it is possible to determine the amount of link usage for each of the 32 links that may be utilized in the switch board. In accordance with the exemplary model for an ISB having a total of 32 links (i.e. 4 links emanating from each of the 8 switch boards), if each link were to support an equal amount of packet traffic, then each link would be restricted once in the set of 32 routes to be restricted and once via a de-facto restriction of a route that traverses the same link in two directions (for example, by reference to FIG.1 a route traversing link $140_0$ twice between connecting source switch $120_0$ with destination switch $120_0$ would be de-facto restricted), or put another way each link would support two routes. Consider again, restriction set 1. In trying to keep the number of routes allocated to each link as close to two as is possible, the inventive technique chooses the sets of restrictions having the least standard deviation in the number of routes allocated to each link. Each physical link connects two switch chips on a switch board, and by examining each parenthetical entry corresponding to these two switch chips, it is possible to determine the number of routes supported by each link. For example, examining the row associated with switch chip 0 in route restriction set 1, it is clear that the number of "1"'s denotes the restricted routes on the four links emanating from switch 0 where switch 0 serves as the intermediate switch chip. The link emanating from port 4 is represented by the first number in each parenthetical set, the link emanating from port 5 corresponds to the second number therein, the link from port 6 corresponds to the third number and the link from port 7 to the fourth number therein. Consider the link emanating from port 5 on switch chip 0. The number of 0's in the second position in each parenthetical set in the row corresponding to switch 0 and excluding those entries corresponding to an entry and an exit on the same port is 1 (i.e. a route entering on port 4 and exiting on port 5 of switch 0). This is the number of routes allocated to the link from port 5 of switch 0 in which switch 0 serves as an intermediate switch. The same link, (from switch 0, port 5 to switch 5, port 4 (see FIG.1) and may also be used in routes in which switch chip 5 serves as an intermediate switch, where switch 0 is the source switch. The number of 0's in the parenthetical set prefixed by 4 in the row associated with restrictions for switch 5 represents the number of routes allowed on this link in which switch 5 serves as an intermediate switch. This number, upon examination, is 3, excluding again entries corresponding to entry and exit over the same link which are de-facto restricted. Thus, the total number of routes allocated to this link from switch chip 0 to switch chip 5 becomes 1+3=4. In a like manner, one may calculate the number of routes allocated to each link from each switch chip on a given board implementing the route restriction set. Accordingly, it is possible to compute the standard deviation for these numbers consequently verifying that the standard deviation for the restriction set is the minimum standard deviation for the 9312 restriction set derived above, in accordance with execution block 624 of routine 600.

Finally, by considering all of the illustrated sets in table 1 it may be observed that overall link usage and overall intermediate switch usage have been balanced as per execution block 626 of routine 600. Consider, for example, switch 0 in route restriction sets 1 and 2. Recall, that we have previously determined that the number of times that a switch chip should serve as an intermediate switch chip in the exemplary switch board as in FIG. 7 (in which 32 routes are to be restricted) is 8 routes. In route restriction set 1, it is clear that switch chip 0 serves as an intermediate switch chip a total of 6 times (i.e. 6 "0"'s across the row, excluding entries and exits on the same port, for switch chip 0), or two less times than it would be utilized in the ideally balanced switch board. In route restriction set 2, it is likewise evident that switch chip 0 serves as an intermediate switch chip a total of 10 times (i.e. 14 "0"'s across the row, excluding entries and exits on the same port, for switch chip 0), or two more times than it would be utilized in the ideally balanced switch board. Thus, it can be seen that usage of switch chip 0 as an intermediate switch chip between route restriction sets 1 and 2 serves to balance the overall usage of switch 0 as an intermediate switch chip between any two switch boards on which the route restriction sets are imposed. In a like manner, the intermediate switch chip usage may be shown to be balanced for all of the switch chips for the four route restriction sets shown in table 1. One may similarly verify that link usage is likewise balanced among multiple ISBs for as many links as is possible based upon the finite number of sets of route restrictions available for use therein.

The so-derived sets of route restrictions may, without loss of generality, be provided on any computer-readable medium, including but not limited to a diskette, CD-ROM, magnetic tape or other known means of storing such information for use by a machine, to a service processor $110_{31}$, or the routine 600 may in some cases execute within a service processor $110_{31}$. In any event, the resultant route restriction sets are selectively used by the Route Table Generation Routine 800 in the manner described below.

Figure 8:
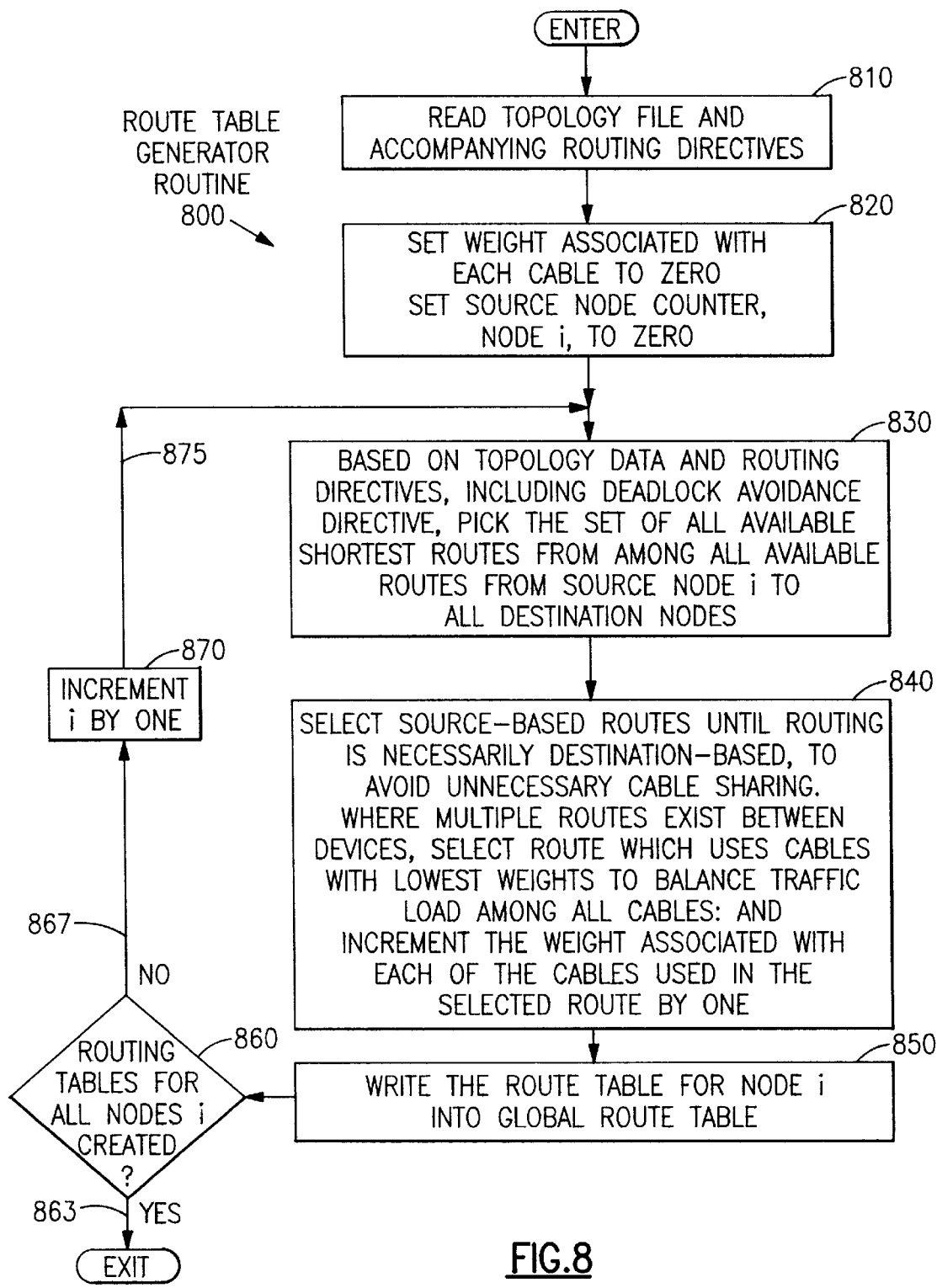
FIG. 8 depicts a high-level flowchart of Route Table Generation Routine 800 that is executed within a service processor, illustratively processing element $415_{511}$, situated within system 400 shown in FIG. 4 in order to define packet routes in accordance with the present inventive teachings.

Reference may be had to FIG. 8 wherein is shown a high-level flow diagram of a Route Table Generator routine 800 executed at a service processor, illustratively processing element $415_{511}$ situated within parallel system 400 in FIG. 4, in order to define packet routes in accordance with the present inventive teachings. Routine 800 is part of the initialization routines which, as discussed above, executes within the service processor.

Upon entry into routine 800, as shown in FIG. 8, execution first proceeds to block 810 which, when executed, reads the topology file and the accompanying and previously described routing directives. To provide deadlock avoidance routing, an appropriate directive must be included into the topology file for each device in the packet network, e.g. a switch circuit (or specifically a switch chip used therein), indicating whether routing through that device is to be restricted or not, i.e. whether a packet can reverse direction through this circuit. Consider a switch board, such as that shown in FIG. 1 which embodies network 100. As noted above, ports 0–3 of each switch chip are connected to links external to the switch board; while ports 4–7 of each switch chip are connected to links (cables) within connection matrix 140 and, there-through, to a port of another switch chip in the same board. The absence of a routing directive, in the topology file, against a particular switch chip signifies that there are no routing restrictions with respect to that chip. As such, a packet can enter this chip on any of its eight ports and leave the chip on any other port; in this instance, the packet can reverse its direction (i.e. "turn around") within the chip. Alternatively, if a routing directive "X(abcd)" exists in the topology file against the switch chip, then a packet entering on either port X would be constrained to be routed to and exit from the chip only on any of ports 0–3 and those of ports 4–7 corresponding to the set (abcd) in which any of a, b, c, or d equals 0, as previously described in detail above. Accordingly, the packet entering on port X would be prohibited from reversing its direction within the chip and exiting on any of ports 4–7 (i.e. represented by a,b,c, and d respectively) for which a, b, c, or d equals 1. However, an "X(abcd)" directive would not restrict packets arriving on any of ports 0–3 of the switch chip, which can be routed to any other port on that chip. A sample line in the topology file with a deadlock avoidance directive is:

> aux route-restrict W(abcd)-X(abcd)-Y(abcd)-Z(abcd) chip_id 1 chip_id 2 . . .

where:
"aux route-restrict" signifies an auxiliary line with a routing directive;
"chip_id 1 chip_id 2 . . . " correspond to numeric identifiers for certain switch chips in the format used within the topology file; and
"W(abcd)-X(abcd)-Y(abcd)-Z(abcd)" are numeric identifiers for certain ports exit restrictions on the identified switch chip in the format used within the topology file, wherein W, X, Y, and Z correspond to ports on the switch chip into which a packet may enter and a,b,c and d correspond respectively to exit restrictions on the same ports on the switch chip, and wherein each set of a,b,c and d correspond to exit restrictions associated with entry on the port W, X, Y, or Z associated with that set.

Once block 810 fully executes, execution proceeds to block 820 which sets the weight associated with each cable (link) specified in the topology file to zero. In addition, a source node counter, node i, is initialized to zero. Thereafter, execution passes to block 830. This particular block, utilizing the data contained in the topology file together with the accompanying deadlock avoidance routing directive, picks a set of available routes, through the packet network, to connect a current source node (node i) with every destination node within the system. The routes are chosen, through a well-known breadth-first search, to be those with the shorted lengths, i.e. those having the fewest individual links (cables) and not necessarily those with the shortest physical length.

Selection of the set of shortest-path routes occurs on a source-based basis, as indicated in block 840, until routes are extended from the current source node to all destination nodes, i.e. when the routes become destination-based. If only one shortest length route results from the source node to a destination node, that route is selected for use therebetween. Alternatively, in those instances, where multiple such routes result between this source node and a common destination node, the one selected route is the one having cables with collectively the lowest weight. Through weight based selection, the traffic load can be balanced, with minimal cable sharing, throughout the entire packet network. Once a particular route is selected between the source node and a destination node, the weight associated with each cable in that route is incremented by one. Though blocks 830 and 840 are shown as distinct blocks to enhance understanding, the operations are generally combined together.

Once all the routes have been selected for all the destination nodes, then execution proceeds to block 850 which executes to write all the selected routes into the global route table, thereby forming a route table for the current source node. Thereafter, execution passes to decision block 860 to determine whether a route table has been written, into the global route table, for every node in the network. If route tables have not been written for every node, decision block 860 routes execution, via NO path 867, to block 870. This latter block, when executed, increments source node counter i by one. Execution then loops back, via path 875, to block 830 to determine and write routes for the next successive node, and so forth. Alternatively, if route tables have been written for all the nodes, then execution exits from routine 800, via YES path 863, emanating from decision block 860. Subsequent to the execution of this routine and prior to the completion of initialization process, the service processor, as discussed above, will provide (specifically copy), through the network, a corresponding portion of the global route table to each and every one of the individual processing elements, including itself, for storage and subsequent use thereat as a local route table. That portion contains only those selected routes for which that particular processing element is a source node.

By now those skilled in the art will realize that although we described our inventive technique in the context of use with massively parallel processing systems that utilize 512 and 256 separate processing elements, our invention is not so limited. In fact, our invention can be applied to eliminate routing deadlocks in substantially any size parallel processing system that utilizes a bi-directional multi-stage interconnected cross-point based packet network. In that regard, our invention can be readily incorporated into a 64-processor system, and similar systems of other sizes, as well as in other systems that utilize multi-stage interconnected cross-point packet networks regardless of the end use.

In contrast to prior art route restriction techniques, such as the technique disclosed in U.S. Pat. No. 5,453,978 entitled "Technique For Accomplishing Deadlock Free Routing Through A Multi-Stage Cross-Point Packet Switch" by Sethu et al., which only considers the restriction of routes that traverse a system partition for passage of a packet between two switches within the same system partition. The present inventive technique entails the investigation of any route that traverses three cross point switches (i.e. a source switch, an intermediate switch, and a destination switch) wherein the source and destination switches are within a first stage of switches and the intermediate switch is within a second stage of switches in the parallel system. By considering every such three switch route for potential route restriction, the present invention enables the restriction of the smallest possible set of such routes to achieve deadlock free routing and avoids an overly broad classification of restricted routes. Accordingly through application of the present technique in the exemplary 512 processor system illustrated in FIG. 4, 32 routes are restricted in a given ISB, whereas in the prior art patent it was required to restrict 48 for the same ISB amounting to an approximate 33% increase in network bandwidth.

Though preferred embodiments have been depicted and described in detail herein, it will be apparent to those skilled in the relevant art, both now and in the future, that various modifications, additions, improvements and enhancements may be made without departing from the spirit of the invention, and these are therefore considered to be within the scope of the invention as defined in the following claims, which should be construed to maintain the proper protection for the invention first disclosed. Having described my invention,

What I claim as new and desired to secure by Letters Patent is as follows:

1. In an apparatus having at least one packet network comprised of successive stages of cross point switches which collectively inter-connect a plurality of nodes external to said network, wherein a packet is carried between two of said nodes and over a prescribed route through said network and at least one of said switches therein, and wherein if one of said switches is coupled to a unique sub-set of said plurality of nodes with respect to the others of said switches, the so-coupled switch is a unique switch and wherein each of said switches may be active or inactive, a method for preventing routing deadlocks from occurring within the network, said method comprising the steps of:

A. first defining a plurality of prescribed routes through said network such that a packet can be carried from individual nodes within said plurality of nodes over different corresponding ones of said routes to every other node within said plurality of nodes, wherein each of said prescribed routes extends over at least one link, said prescribed routes being defined by:

A.1. establishing a postulate number of said routes through said network and three of said switches therein, which are to be restricted from permitting the passage of said packets thereover, said postulate number being evenly divisible by the number of the active switches in the network, the first of said three switches in said restricted routes through the network and three of said switches therein being a source switch included in a first of said successive stages of cross point switches, the second of said three switches being an intermediate switch included in a second of said successive stages of cross point switches, and the third of said three switches being a destination switch included in said first of said successive stages of cross point switches, such a route through said three switches defining a source-destination pair of said switches;

A.2. dividing the postulate number by the number of active switches in the network to produce a per switch route restriction number for the network;

A.3. determining a source-destination pair number of routes to restrict between each of the source-destination pairs of switches in the network, such that from each of said active switches, a number of routes equal to the per switch route restriction number is restricted, and the number of routes restricted between each of the source destination pairs of switches is approximately equal;

A.4. generating a group of at least one sets of deadlock free route restrictions for said network wherein for each of said sets, the number of routes restricted at each switch is equal to said per switch route restriction number, the number of routes restricted between each of the source destination pairs of switches is approximately equal, and wherein for each of said sets, no routing deadlock exists for said routes that are unrestricted and at least one route between each of said source destination pair of switches is not restricted; and A.5. choosing at least one of said sets from said group of at least one sets of deadlock free route restrictions, said chosen sets to be used in determining which of said routes through said network and three of said switches are to be restricted, thereby excluding the routes in the chosen set from the defined plurality of prescribed routes; and B. storing all of said prescribed routes in a resulting route table.

2. A method according to claim 1 wherein step A.4. further includes the steps of:

A.4.1. choosing a first portion of said switches in said network;

A.4.2. determining, for each one of said source destination pairs in said chosen first portion of switches, every possible set of said routes through the network and three of said switches which may be restricted from the source switch to the destination switch, such that the number of routes restricted between each of the source destination pairs of switches in the chosen first portion is approximately equal;

A.4.3. determining, for each of said determined sets of route restrictions in step A.4.2, whether a deadlock on any routes that are unrestricted would result by imposing said determined set of route restrictions on said first portion of said switches, and discarding said sets of route restrictions for which a deadlock would result, said sets of route restrictions for which no deadlocks would result being retained as a group of deadlock free route restriction sets for said first portion of said switches;

A.4.4. adding at least one of said unique, active switches to said first portion of switches to create a new chosen first portion of switches and repeating steps A.4.2. through A.4.4 until all of said unique, active switches in said network are included in said chosen first portion; and A.4.5. incrementing said postulate number and repeating steps, A.2. through A.4. until it has been determined for each of said deadlock free route restriction sets in said group of at least one sets of deadlock free route restrictions for said network, that at least one of said routes between each source-destination pair of switches in said network is not restricted.

3. A method according to claim 1 wherein the source-destination pair number of routes to restrict between each of the source-destination pairs of switches in the network is determined by minimizing the standard deviation of the number of routes restricted between all of the source-destination pairs of switches in the network.

4. A method according to claim 1 wherein said apparatus includes a plurality of identical ones of said networks, said plurality of networks being inter-connected via said successive stages of cross-point switches, and wherein any one of said at least one chosen route restriction sets from step A.5. are used in determining which of said routes are to be restricted for at least one of said plurality of networks.

5. A method according to claim 4 wherein step A.5. further includes the steps of:

A.5.1. calculating, for each of said sets in said group of at least one sets of deadlock free route restrictions, the number of unrestricted routes allocated to each link in any one of the plurality of identical networks; and A.5.2. eliminating each of said sets not having an approximately equal number of unrestricted routes allocated to each link, from the group of at least one sets of deadlock free route restrictions from which said at least one deadlock free route restriction sets is to be chosen.

6. A method according to claim 4 wherein step A.5. further includes the steps of;

A.5.1. calculating, for each of said sets in said group of at least one sets of deadlock free route restrictions, the number of unrestricted routes for which each of said switches in any one of said plurality of identical networks is an intermediate switch; and A.5.2. discarding each of said sets not having an approximately equal number of unrestricted routes for which each of said switches in any one of said plurality of identical networks is an intermediate switch, from the group of at least one sets of deadlock free route restrictions from which said at least one deadlock free route restriction sets is to be chosen.

7. A method according to claim 4 wherein step A.5. further includes the step of:

choosing a plurality of said sets from the group of at least one sets of deadlock free route restrictions such that the imposition of said plurality of chosen sets of deadlock free routing restrictions upon the plurality of networks results in balanced link usage in the apparatus.

8. A method according to claim 4 wherein the step A.5. further includes the step of:

choosing a plurality of said sets from the group of sets of deadlock free route restrictions such that the imposition of said plurality of chosen sets of deadlock free routing restrictions upon the plurality of networks results in balanced intermediate switch usage in the apparatus.

9. A method according to claim 1 further comprising the steps of:

in assembling a packet to be routed in said network from a source node to a destination node, both within said plurality of nodes, accessing the resulting route table to yield a resultant route for said packet;

copying the resultant route into said packet; and routing said packet over said resultant route through the network.

10. A method according to claim 9 further including the step of downloading a different portion of said resulting route table into a separate corresponding local route table associated with each one of said plurality of nodes, each of said resulting route table portions specifying all of said prescribed routes with said each one node as a source node; and said resultant route copying step further includes, for a packet that is to be sent from the source node to the destination node, the step of accessing, based upon the destination node for the packet, the local route table for the source node to yield the resultant route.

11. A method according to claim 10 wherein each of said packets includes a header having a routing field including at least one route byte, said routing field collectively specifying a route through which each packet will pass in the network, with each one of said route bytes defining a route through which each of said packets will traverse through a corresponding at least one of said cross point switches, and wherein the resultant route copying step further includes the step of copying a value of each successive one of said route bytes in said resultant route into a separate corresponding successive route byte in said routing field.

12. A method according to claim 11 further including the step of operating the apparatus in a service phase and a run phase, and executing first defining step A through the prescribed routes storing step B during the service phase and the resultant route accessing, the resultant route copying and packet routing steps during the run phase.

13. A method according to claim 11 wherein the first defining step further comprises the steps of:

determining, in response to network devices and interconnection data within a topology file, all available shortest-path routes from each of said nodes, taken as a source node, to every other available one of said nodes, taken as a destination node, but excluding any route, for inclusion within the shortest-path routes, that has a path through one of the devices prohibited by a deadlock avoidance directive for any one said device and contained in said topology file;

if one shortest route results between said source node and said destination node, writing that one shortest-path route into the resulting route table as the prescribed route between the source node and the destination node;

if more than one shortest-path route results between said source node and said destination node, choosing from among the shortest-path routes the one shortest-path route having collectively a minimum weight associated therewith as the prescribed route between the source node and the destination node; and incrementing a separate corresponding weight, associated with each link in the prescribed route, by a pre-defined amount.

14. A method according to claim 13 wherein said routes determining step comprises the step of conducting a breadth-first search to locate all available shortest-path routes.

15. A method according to claim 14 further comprising the step of operating the apparatus in a service phase and a run phase, and executing the first defining step A through the prescribed route storing step B during the service phase and the resultant route accessing, the resultant route copying, and packet routing steps during the run phase.

16. In a system having at least one packet network comprising successive stages of cross point switches which collectively inter-connect a plurality of nodes external to said network, wherein a packet is carried between two of said nodes and over a prescribed route through said network and at least one of said switches therein, and wherein if one of said switches is coupled to a unique sub-set of said plurality of nodes with respect to the others of said switches, the so-coupled switch is a unique switch and wherein each of said switches may be active or inactive, an apparatus for preventing routing deadlocks from occurring within the network, said apparatus comprising:

A. first means for defining a plurality of prescribed routes through said network such that a packet can be carried from individual nodes within said plurality of nodes over different corresponding ones of said routes to every other node within said plurality of nodes, wherein each of said prescribed routes extends over at least one link, said first means for defining said plurality of prescribed routes including means for:

A.1. establishing a postulate number of said routes through said network and three of said switches therein, which are to be restricted from permitting the passage of said packets thereover, said postulate number being evenly divisible by the number of the active switches in the network, the first of said three switches in said restricted routes through the network and three of said switches therein being a source switch included in a first of said successive stages of cross point switches, the second of said three switches being an intermediate switch included in a second of said successive stages of cross point switches, and the third of said three switches being a destination switch included in said first of said successive stages of cross point switches, such a route through said three switches defining a source-destination pair of said switches;

A.2. dividing the postulate number by the number of active switches in the network to produce a per switch route restriction number for the network;

A.3. determining a source-destination pair number of routes to restrict between each of the source-destination pairs of switches in the network, such that from each of said active switches, a number of routes equal to the per switch route restriction number is restricted, and the number of routes restricted between each of the source destination pairs of switches is approximately equal;

A.4. generating a group of at least one sets of deadlock free route restrictions for said network wherein for each of said sets, the number of routes restricted at each switch is equal to said per switch route restriction number, the number of routes restricted between each of the source destination pairs of switches is approximately equal, and wherein for each of said sets, no routing deadlock exists for said routes that are unrestricted and at least one route between each of said source destination pair of switches is not restricted; and A.5. choosing at least one of said sets from said group of at least one sets of deadlock free route restrictions, said chosen sets to be used in determining which of said routes through said network and three of said switches are to be restricted, thereby excluding the routes in the chosen set from the defined plurality of prescribed routes; and B. means for storing all of said prescribed routes in a resulting route table.

17. An apparatus according to claim 16 wherein said means for generating said group of at least one sets of deadlock free route restrictions for said network at A.4. further includes means for:

A.4.1. choosing a first portion of said switches in said network;

A.4.2. determining, for each one of said source destination pairs in said chosen first portion of switches, every possible set of said routes through the network and three of said switches which may be restricted from the source switch to the destination switch, such that the number of routes restricted between each of the source destination pairs of switches in the chosen first portion is approximately equal;

A.4.3. determining, for each of said determined sets of route restrictions determined by said determining means in A.4.2, whether a deadlock on any routes that are unrestricted would result by imposing said determined set of route restrictions on said first portion of said switches, and discarding said sets of route restrictions for which a deadlock would result, said sets of route restrictions for which no deadlocks would result being retained as a group of deadlock free route restriction sets for said first portion of said switches;

A.4.4. adding at least one of said unique, active switches to said first portion of switches to create a new chosen first portion of switches and repeating A.4.2. through A.4.4 until all of said unique, active switches in said network are included in said chosen first portion; and A.4.5. incrementing said postulate number and repeating steps, A.2. through A.4. until it has been determined for each of said deadlock free route restriction sets in said group of at least one sets of deadlock free route restrictions for said network, that at least one of said routes between each source-destination pair of switches in said network is not restricted.

18. An apparatus according to claim 16 wherein the source-destination pair number of routes to restrict between each of the source-destination pairs of switches in the network is determined by minimizing the standard deviation of the number of routes restricted between all of the source-destination pairs of switches in the network.

19. An apparatus according to claim 16 including a plurality of identical ones of said networks, said plurality of networks being inter-connected via said successive stages of cross-point switches, and wherein any one of said at least one chosen route restriction sets from A.5. are used in determining which of said routes are to be restricted for at least one of said plurality of networks.

20. An apparatus according to claim 19 wherein said means for choosing in A.5. further includes means for:

A.5.1. calculating, for each of said sets in said group of at least one sets of deadlock free route restrictions, the number of unrestricted routes allocated to each link in any one of the plurality of identical networks; and A.5.2. eliminating each of said sets not having an approximately equal number of unrestricted routes allocated to each link, from the group of at least one sets of deadlock free route restrictions from which said at least one deadlock free route restriction sets is to be chosen.

21. An apparatus according to claim 19 wherein said means for choosing in A.5. further includes means for:

A.5.1. calculating, for each of said sets in said group of at least one sets of deadlock free route restrictions, the number of unrestricted routes for which each of said switches in any one of said plurality of identical networks is an intermediate switch; and A.5.2. discarding each of said sets not having an approximately equal number of unrestricted routes for which each of said switches in any one of said plurality of identical networks is an intermediate switch, from the group of at least one sets of deadlock free route restrictions from which said at least one deadlock free route restriction sets is to be chosen.

22. An apparatus according to claim 19 wherein said means for choosing in A.5. further includes means for:

choosing a plurality of said sets from the group of at least one sets of deadlock free route restrictions such that the imposition of said plurality of chosen sets of deadlock free routing restrictions upon the plurality of networks results in balanced link usage in the apparatus.

23. An apparatus according to claim 19 wherein the means for choosing in A.5. further includes means for:

choosing a plurality of said sets from the group of sets of deadlock free route restrictions such that the imposition of said plurality of chosen sets of deadlock free routing restrictions upon the plurality of networks results in balanced intermediate switch usage in the apparatus.

24. An apparatus according to claim 16 wherein said prescribed routes are of a form:

"aux route-restrict W(abcd)-X(abcd)-Y(abcd)-Z(abcd) chip_id" and wherein:
"aux route-restrict" signifies an auxiliary line in said resulting route table;
"chip_id" corresponds to numeric identifiers for certain of said switches; and
"W(abcd)-X(abcd)-Y(abcd)-Z(abcd)" are numeric identifiers for port exit restrictions on an identified switch and wherein W, X, Y, and Z correspond to ports on the identified switch in which one of said packets may enter and a,b,c and d correspond respectively to exit restrictions for said entering packet on the same ports on the identified switch, and wherein each set of a,b,c and d correspond to exit restrictions associated with entry of said entering packet on the port W, X, Y, or Z associated with that set.

25. An apparatus according to claim 16 further comprising:

a separate corresponding local route table associated with each one of said plurality of nodes into which a different portion of said resulting route table portions specifying all ones of said prescribed routes with said each one node as a source node; and
means for accessing, for a packet that is to emanate from the source node to the destination node, based upon the destination node for the packet, the local route table for the source node to yield the resultant route.

26. An apparatus according to claim 25 wherein each of said packets includes a header having a routing field including at least one route byte, said routing field collectively specifying a route through which each packet will pass in the network, with each one of said route bytes defining a route through which each of said packets will traverse through a corresponding at least one of said cross point switches, and wherein a value of each successive one of said route bytes in said resultant route is copied into a separate corresponding successive route byte in said routing field.

27. An apparatus according to claim 26 wherein the first defining means further includes:

means for determining, in response to network devices and inter-connection data within a topology file, all available shortest-path routes from each of said nodes, taken as a source node, to every other available one of said nodes, taken as a destination node, but excluding any route, for inclusion within the shortest-path routes, that has a path through one of the devices prohibited by a deadlock avoidance directive for any one said device and contained in said topology file;

means, operative if one shortest route results between said source node and said destination node, for writing that one shortest-path route into the resulting route table as the prescribed route between the source node and the destination node;

means, operative if more than one shortest-path route results between said source node and said destination node, for choosing from among the shortest-path routes the one shortest-path route having collectively a minimum weight associated therewith as the prescribed route between the source node and the destination node; and means for incrementing a separate corresponding weight, associated with each link in the prescribed route, by a predefined amount.

28. An apparatus according to claim 27 wherein said means for determining said shortest-path routes includes means for conducting a breadth-first search to locate all available shortest-path routes.

29. The apparatus according to claim 27 wherein said system is a parallel processing system and each of said nodes comprises a separate processing element.

30. The apparatus according to claim 29 wherein said parallel processing system comprises 512 separate processing elements and said switches are arranged into 32-port switch boards and said system further comprises a plurality of said switch boards wherein 32 of said switch boards are node switch boards (NSBs) and 16 of said switch boards are intermediate switch boards (ISBs), with said ISBs collectively inter-connecting all of said NSBs such that a corresponding one of 16 ports on each of said NSBs is connected through a different corresponding link, to the same corresponding port on each one of said NSBs and the remaining 16 ports on each of the NSBs are connected to 16 different successive ones of said processing elements.

31. The apparatus according to claim 29 wherein said parallel processing system comprises 256 separate processing elements and said switches are arranged into 32-port switch boards and said system further comprises a plurality of said switch boards wherein 16 of said switch boards are node switch boards (NSBs) and 8 of said switch boards are intermediate switch boards (ISBs), with said ISBs collectively inter-connecting all of said NSBs such that a corresponding one of 16 ports on each of said NSBs is connected through a different corresponding link, to the same corresponding port on each one of said NSBs and the remaining 16 ports on each of the NSBs are connected to 16 different successive ones of said processing elements.

* * * * *